(12) United States Patent
Miyanabe et al.

(10) Patent No.: US 6,804,187 B2
(45) Date of Patent: Oct. 12, 2004

(54) SIGNAL DELAY APPARATUS, LEAKAGE SIGNAL REMOVING APPARATUS AND INFORMATION PROCESSING APPARATUS

(75) Inventors: Shogo Miyanabe, Tsurugashima (JP); Hiroki Kuribayashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 560 days.

(21) Appl. No.: 09/955,239

(22) Filed: Sep. 19, 2001

(65) Prior Publication Data
US 2002/0034268 A1 Mar. 21, 2002

(30) Foreign Application Priority Data
Sep. 19, 2000 (JP) .................................... P2000-284219

(51) Int. Cl.$^7$ ................................................. G11B 7/00
(52) U.S. Cl. ........................... 369/124.03; 369/124.17; 369/44.32
(58) Field of Search .................. 369/124.03, 124.02, 369/124.05, 124.14, 47.17, 53.33, 44.42, 44.32, 44.34

(56) References Cited

U.S. PATENT DOCUMENTS 6,134,211 A * 10/2000 Miyanabe et al. ..... 369/124.05

* cited by examiner

*Primary Examiner*—Nabil Hindi
(74) *Attorney, Agent, or Firm*—Morgan, Lewis & Bockius, LLP

(57) ABSTRACT

In the case of delaying any one of the detected signals, which are optically obtained from a plurality of trucks, in which the information are respectively recorded under a state that the DC component is removed, a zero cross waveform is extracted from a main detected signal, which is obtained from a main truck. Then, a sub detected signal obtained from a sub truck is held at a timing at which this zero cross waveform is extracted. Further, a sub detected signal, which has been held during a predetermined time frame, is averaged. Moreover, delay amounts with respect to the sub detected signal and the main detected signal are calculated by comparing a waveform of the averaged sub detected signal and the zero cross waveform. Then, the present sub detected signal and the main detected signal are delayed by the calculated delay amounts.

13 Claims, 18 Drawing Sheets

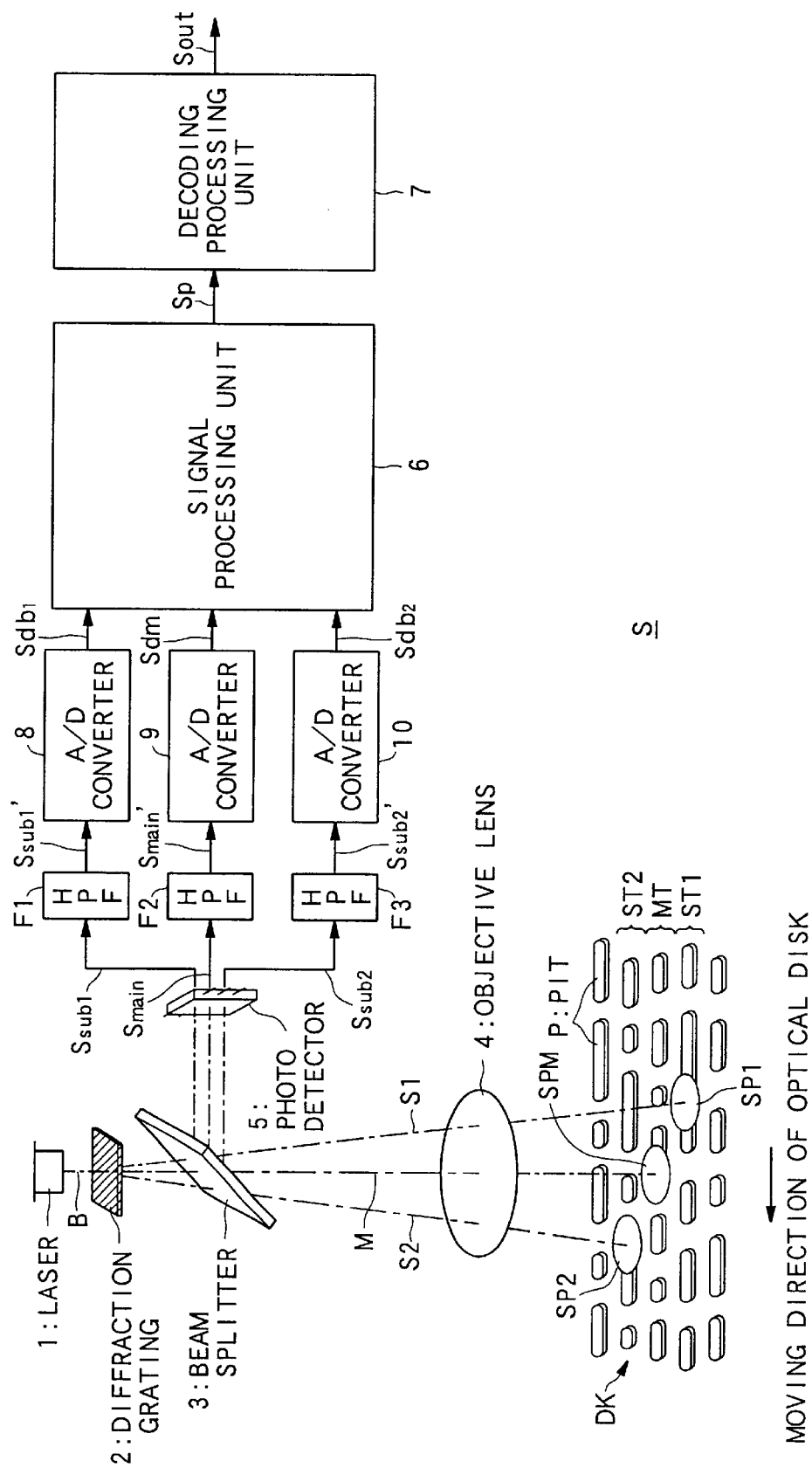

| COMPLEMENT INDICATION OF 2 | | STRAIGHT INDICATION | | CONTENT OF $S_{vd1}$ |
|---|---|---|---|---|
| CONTENT OF $S_{cd1}$ | BIT INDICATION | CONTENT OF $S_{cd1}$ | BIT INDICATION | |
| 3 | (0 1 1) | 7 | (1 1 1) | $S_{r8}$ |
| 2 | (0 1 0) | 6 | (1 1 0) | $S_{r7}$ |
| 1 | (0 0 1) | 5 | (1 0 1) | $S_{r6}$ |
| 0 | (0 0 0) | 4 | (1 0 0) | $S_{r5}$ |
| −1 | (1 1 1) | 3 | (0 1 1) | $S_{r4}$ |
| −2 | (1 1 0) | 2 | (0 1 0) | $S_{r3}$ |
| −3 | (1 0 1) | 1 | (0 0 1) | $S_{r2}$ |
| −4 | (1 0 0) | 0 | (0 0 0) | $S_{r1}$ |

SIGNAL DELAY APPARATUS, LEAKAGE SIGNAL REMOVING APPARATUS AND INFORMATION PROCESSING APPARATUS

BACKGROUND OF THE INVENTION

1. Field of the Invention

The present invention relates to a technical field of a signal delay apparatus, a leakage signal removing apparatus and an information processing apparatus. More specifically, the present invention relates to a technical field of a signal delay apparatus for controlling delay amounts of detected signals, which are obtained from a plurality of tracks formed on a recording medium, respectively, a leakage signal removing apparatus including the forgoing signal delay apparatus for removing a leakage signal caused by the detected signals of other trucks from any detected signal and an information processing apparatus including the foregoing leakage signal removing apparatus.

2. Description of the Related Art

Conventionally, in the case that the information is detected from the truck formed on the recording medium such as an optical disk or the like, an optical beam is irradiated to this truck and this information is detected on the basis of the reflected light of this optical beam from the track.

On one hand, in recent years, narrowing of truck pitch (namely, narrowing of spacing between the trucks, which are adjacently formed) in the trucks on the recording medium is noticeable at the request of improvement of the recording density. However, in this case, if the optical beam is irradiated to the truck, in which the information to be detected is recorded, a portion of a light spot formed by that optical beam on the recording medium is also irradiated on the truck adjoining the truck to be irradiated (namely, the truck which should not be originally irradiated by the optical beam). As a result, there was a case such that the information recorded in that adjoining truck was leaked in its reflection light as so-called cross talk (a leakage signal).

Therefore, conventionally, the above optical beam is divided into three on a flat surface by using a diffraction grating or the like. Then, a central one of them (hereinafter, referred to as a main beam) is irradiated toward the truck to be originally irradiated and other two beams (hereinafter, referred to as a sub beam, respectively) are irradiated to the two trucks adjoining the both sides of the truck to be originally irradiated, respectively. After that, two detected signals to be obtained from the reflection light of the sub beam are subtracted from the detected signals obtained from the reflection light of the main beam, so that the above described cross talk component, which is included in the detected signal obtained from the reflection light of the main beam, is deleted.

In the above case, according to the conventional cross talk deleting system, the main beam and two sub beams are generated by the diffraction grating or the like, so that a line connecting an irradiation center point of respective beams on the recording medium was not orthogonal to a moving direction of respective trucks.

Therefore, according to the conventional leakage signal removing system, the detected signals obtained from the reflection light of one of the sub beams and the detected signals obtained from the reflection light of the main beam are delayed by fixed times, which are different each other. Then, after orthogonalizing the line connecting the irradiation center points of respective beams and the moving direction of respective trucks for processing the signals (i.e., apparently), the two detected signals obtained from the reflection light of the sub beam are subtracted from the detected signals obtained from the reflection light of the main beam, respectively, so as to remove the above described cross talk.

However, according to the above described tendency of narrowing of truck pitch, the spacing between the above main beam and respective sub beams is also apt to be narrowed. Therefore, it is necessary to fix the spacing more exactly and remove the cross talk. On the contrary, if the oscillation wavelength of the semiconductor laser serving as an ejection source of respective optical beams is changed, the separation condition by the diffraction grating is changed. As a result, the spacing between the main beam and the sub beams subjects to be changed.

In this case, if this spacing is changed, originally, it is necessary to change the delay amount of respective detected signals depending on the change of the spacing. However, as described above, conventionally, the delay amount is always fixed for respective detected signals, so that this involves a problem such that it is not possible to obtain an appropriate delay amount for orthogonalizing the line connecting the irradiation center point of respective beams and the moving direction of respective trucks for processing the signals in response to the oscillation wavelength of the optical beam.

Further, this problem leads to a problem such that it is not possible to appropriately remove the cross talk and the detected signal is generated as the noise by the cross talk remains in the detected signal in association with the information to be detected, so that the information by the use of this detected signal can not be accurately recorded or reproduced.

SUMMARY OF THE INVENTION

The present invention has been made taking the present problems into consideration, an object of which is to provide a signal delay apparatus capable of calculating an accurate signal delay amount for removing the cross talk even in the case that the irradiation manner of the optical beam such as the beam spacing or the like is changed, a leakage signal removing apparatus capable of more accurately removing the cross talk and further, an information processing apparatus capable of accurately performing the information processing such as recording or playing or the like by the use of the detected signal, from which the cross talk is accurately removed.

The above object of the present invention can be achieved by a signal delay apparatus of the present invention for delaying any one of detected signals, which are optically obtained from a plurality of adjoining trucks. The apparatus is provided with: an extracting device for extracting a specific main detected signal having a predetermined specific waveform from a main detected signal which is obtained from a main truck among said trucks; a holding device for holding a sub detected signal which is obtained from a sub truck when said specific main detected signal is extracted; an averaging device for averaging a plurality of said sub detected signals, which are held by said holding device during a predetermined time frame, and generating an averaged detected signal; a calculating device for comparing a waveform of said generated averaged detected signal with said specific waveform and calculating the delay amount for any one of said detected signals; and a delay device for delaying at least any one of said detected signals by said calculated delay amount.

According to the present invention, the delay amount of at least any one of detected signals is calculated by comparing a waveform of an obtained averaged detected signal and a specific waveform, so that, even if the irradiation manner of the optical beam to be irradiated to respective trucks is changed, it is possible to delay respective detected signals by accurately calculating the delay amount.

In one aspect of the present invention, said specific waveform comprises a zero cross waveform.

According to this aspect, the delay amount is calculated by using a zero cross waveform as a typical specific waveform, so that it is possible to simply and accurately calculate the present delay amount.

In another aspect of the present invention, said specific waveform is provided with a waveform of said main detected signal, which is obtained from any one of a pit formed on said main truck in association with said information and a gap between pits, having a length which is longer than the length obtained by multiplying a unit length of at least any one of said pit and gap by a predetermined number.

According to this aspect, a waveform of the main detected signal, which is obtained from a pit or spacing between pits having a length not less than a predetermined length, is defined as a specific waveform, so that it is possible to enlarge a capture range in the delay amount control and calculate the present delay amount accurately.

In further aspect of the present invention, said specific waveform during a predetermined time from said detected signal is started to be obtained is provided with a waveform of said main detected signal, which is obtained from any one of a pit formed on said main truck in association with said information and a gap between pits, having a length which is longer than the length obtained by multiplying a unit length of at least any one of said pit and gap by a predetermined number, and said specific waveform after said time passed over is provided with a waveform of said main detected signal, which is obtained from any one of said pit and gap having all lengths.

According to this aspect, just after the present detected signal is started to be obtained and the detected signal becomes unstable, a waveform of the main detected signal, which is obtained from a pit or spacing between pits having a length not less than a predetermined length, is defined as a specific waveform and then, the delay amount is calculated as the waveform of the main detected signal, which is obtained from all pits or spacing between pits, is defined as a specific waveform, so that it is possible to calculate the present delay amount more accurately.

In further aspect of the present invention, said predetermined number is provided with a number corresponding to a length, which is longer than the shortest length of any one of said pit and gap, from which said main detected signal is obtained.

According to the present invention, the delay amount is calculated by using the detected signal, which is obtained under a wide captain challenge, as well as a good ratio between a signal and noise is provided, so that it is possible to calculate the present delay amount more accurately.

In further aspect of the present invention, said delay device is provided with a shift register.

According to this aspect, it is possible to simply realize a delay device.

In further aspect of the present invention, said delay device is provided with a shift register and a FIR (Finite Impulse Response) filter.

Accordingly, it is possible to delay the detected signal more accurately.

In further aspect of the present invention, said FIR filter comprises two taps and a sum of respective tap coefficients in association with said respective taps is 1.

According to this aspect, it is possible to realize the delay device by using a simple FIR filter.

In further aspect of the present invention, said sub truck is provided with said two trucks, which are adjacently formed on the opposite sides of said main truck and an irradiation position of respective optical beams, which are irradiated to said sub truck, moves to said main truck side rather than said respective sub trucks, so that said respective optical beams are irradiated.

According to this aspect, on the basis of a sub detected signal, which is obtained by a higher ratio between a signal and noise, it is possible to calculate the delay amount more accurately.

In further aspect of the present invention, said main truck comprises said truck, in which said information to be read is recorded.

According to this aspect, it is possible to calculate the delay amount so that the information is capable of being read more accurately.

In further aspect of the present invention, said main truck comprises said truck, which adjoins to said truck, in which said information to be read is recorded.

According to this aspect, it is possible to calculate the delay amount so that the information is capable of being read more accurately.

The above object of the present invention can be achieved by a leakage signal removing apparatus of the present invention. The apparatus is provided with: (i) a signal delay apparatus for delaying any one of detected signals, which are optically obtained from a plurality of adjoining trucks, is provided with: an extracting device for extracting a specific main detected signal having a predetermined specific waveform from a main detected signal which is obtained from a main truck among said trucks; a holding device for holding a sub detected signal which is obtained from a sub truck when said specific main detected signal is extracted; an averaging device for averaging a plurality of said sub detected signals, which are held by said holding device during a predetermined time frame, and generating an averaged detected signal; a calculating device for comparing a waveform of said generated averaged detected signal with said specific waveform and calculating the delay amount for any one of said detected signals; and a delay device for delaying at least any one of said detected signals by said calculated delay amount, (ii) a removing device for removing a leakage signal, which is mixed in said main detected signal, from said detected signal, which is obtained from said sub truck by using said detected signal, which is obtained from said sub truck and is delayed by said delay device.

According to the present invention, it is possible to remove a leakage signal (cross talk) in the main detected signal more accurately.

The above object of the present invention can be achieved by a signal processing apparatus is provided with: (a) a leakage signal removing apparatus is provided with (i) a signal delay apparatus for delaying any one of detected signals, which are optically obtained from a plurality of adjoining trucks, comprising: an extracting device for extracting a specific main detected signal having a predetermined specific waveform from a main detected signal which is obtained from a main truck among said trucks; a holding device for holding a sub detected signal which is obtained from a sub truck when said specific main detected signal is extracted; an averaging device for averaging a plurality of said sub detected signals, which are held by said holding device during a predetermined time frame, and generating an averaged detected signal; a calculating device for comparing a waveform of said generated averaged detected signal with said specific waveform and calculating the delay amount for any one of said detected signals; and a delay device for delaying at least any one of said detected signals by said calculated delay amount, (ii) a removing device for removing a leakage signal, which is mixed in said main detected signal, from said detected signal, which is obtained from said sub truck by using said detected signal, which is obtained from said sub truck and is delayed by said delay device, (b) a processing device for effecting at least any one of recording of said information in said truck or playing of said information on the basis of said main detected signal, of which said leakage signal is removed.

According to the present invention, it is possible to accurately perform any one of recording or playing by the use of the main detected signals, from which the leakage signals are accurately removed.

BRIEF DESCRIPTION OF THE DRAWINGS

FIG. 2 is a block diagram for illustrating a schematic structure of an information playing apparatus according to an embodiment of the present invention;

DESCRIPTION OF THE PREFERRED EMBODIMENTS

In the next place, an embodiment preferable for the present invention will be explained with reference to the drawings.

In the embodiment to be described below, the present invention is applied to an information reproducing apparatus. In the information reproducing apparatus, one main beam is irradiated to a truck, in which the information to be read is recorded (hereinafter, this truck is referred to as a main truck), if only a portion of a truck formed on an optical disk in a helical configuration is seen. Further, the sub beams are irradiated one by one to two sub trucks, which are adjacently formed on the both sides of the main truck, respectively. Moreover, the detected signals generated by receiving the reflection light of respective sub beams, which are obtained from the optical disk, are subtracted from the main detected signals, which are generated by receiving the reflection light of the main beam, respectively. Then, the information reproducing apparatus removes the cross talk included in the main detected signal caused by reason that the edge of the optical spot formed by the main beam is included with the sub trucks and reproduces the necessary information.

(I) Explanation of Principle

At first, before specifically explaining the embodiment of the information playing apparatus, a principle of the present invention will be explained below by using FIG. 1.

Generally, upon removing the above described cross talk by the use of three optical beams, it is preferable that the cross talk included in the detected signals, which are obtained from the reflection light of the main beam, is removed by paralleling a direction of a line connecting irradiation points of respective optical beams to a radial direction of the optical disk and irradiating respective optical beams in this state.

However, as described above, in the case of separating the present one optical beam into three optical beams and generating three optical beams, normally, they are generated by the use of diffraction due to diffraction grating, so that the direction of the line connecting irradiation points of respective optical beams is not identical with the radial direction of the optical disk.

Therefore, according to an actual information reproducing apparatus, delaying each of the detected signals, which are obtained from the reflection light of one sub beam, and the detected signals, which are obtained from the reflection light of the main beam, by different predetermined times, orthogonalizing the direction of the line connecting irradiation points of respective optical beams and a moving (rotating) direction of the optical disk for processing the signals (i.e., apparently) and subtracting two detected signals, which are obtained from the reflection light of the sub beam, from the detected signals, which are obtained from the reflection light of the main beam, respectively, the above described cross talk is removed.

Figure 1A:
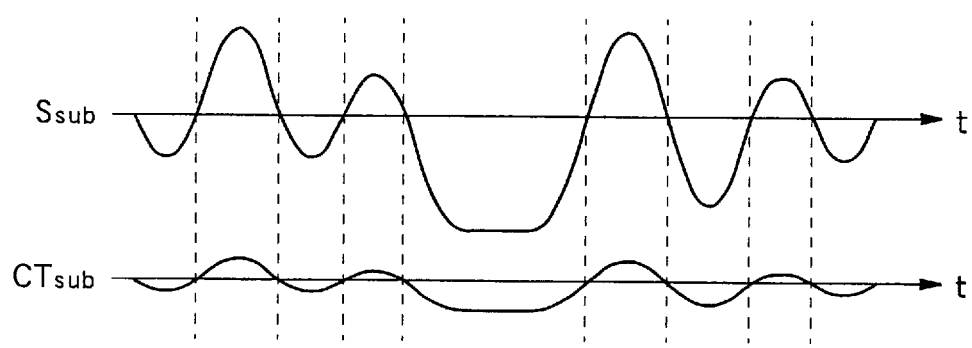
FIGS. 1A and 1B are diagrams for illustrating a principle of the present invention.

In this case, it is supposed that the above described cross talk normally has a waveform such that a signal level of the detected signal obtained from the reflection light of the sub beam is simply attenuated. However, in the state that the direction of the line connecting irradiation points of respective optical beams and the radial direction of the optical disk are orthogonalized, as shown in FIG. 1A, a phase of a cross talk CTsub (namely, across talk included in the detected signal, which is obtained from the reflection light of the main beam, by reason that a portion of the optical spot formed by the main beam is involved with the sub trucks) in the detected signal, which is obtained from the reflection light of the main beam, and a phase of a detected signal Ssub, which is obtained from the reflection light of the sub beam, are identical.

Figure 1B:
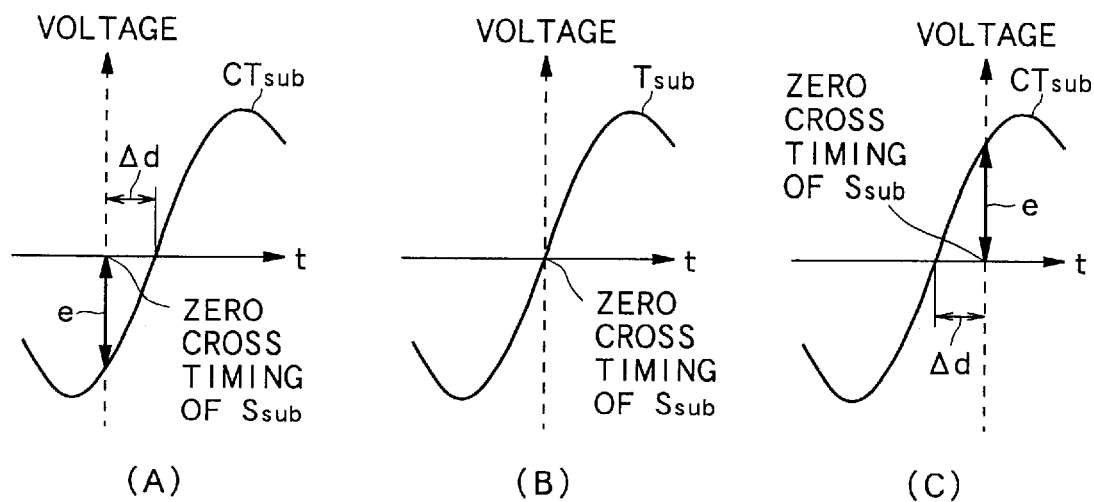

On one hand, in the case that the delay amount of respective detected signals to be delayed is not appropriate, as shown in FIG. 1B, the phase of the above described cross talk CTsub is deviated to any one of positive (in FIG. 1B (A)) or negative (FIG. 1B (C)) by $\Delta d$, for example, on the basis of a zero cross timing of the above described detected signal Ssub.

Therefore, according to the present invention, by detecting this phase's deviation $\Delta d$ and controlling the delay amounts for respective detected signals so that the present deviation becomes zero, appropriate delay amounts for these respective detected signals are obtained. Thus, by orthogonalizing the direction of the line connecting irradiation points of respective optical beams and a moving (rotating) direction of the optical disk for processing the signals, the foregoing cross talk CTsub in the detected signal obtained from the reflection of the main beam is removed.

Upon controlling the delay amount in the present invention, according to the above described principle, the phase of the cross talk CTsub in the detected signal, which is obtained from the reflection light of the main beam, is compared to the phase of a detected signal Ssub, which is obtained from the reflection light of the sub beam, and the delay amount is controlled so that these two phases are identical with each other. However, other than this, by comparing a phase of a cross talk CTmain (namely, a cross talk included in the detected signal by reason that a portion of the optical spot formed by the sub beam is involved with the main trucks) in the detected signal Ssub, which is obtained from the reflection light of the sub beam, to a phase of a detected signal Smain, which is obtained from the reflection light of the main beam, the control amount in the delay amount to be controlled may be calculated from this phase deviation.

(II) An Embodiment

In the next place, an information playing apparatus according to an embodiment of the present invention considering the above described principle will be explained with reference to FIGS. 2 to 7 below.

At first, by using FIG. 2, a schematic structure and the operation of the information playing apparatus according to the embodiment of the present invention will be described.

As shown in FIG. 2, the information reproducing apparatus S for reproducing the information, which is recorded on an optical disk DK by a pit P having plural kinds of lengths, as removing the above described cross talk by simultaneously irradiating three optical beams is comprised of: a laser 1; a diffraction grating 2; a beam splitter 3; an objective lens 4; a photo detector 5; a signal processing unit 6; a decoding processing unit 7 as a processing device; A/D (Analog/Digital) converters 8 to 10; and high pass filters F1 to F3.

Next, the operations of respective parts will be explained.

At first, the laser 1 generates an optical beam B for reproducing the information having a fixed strength, which is set in advance, and irradiates it to the diffraction grating 2.

Then, the diffraction grating 2 separates the optical beam B into a maim beam M to be irradiated to a main truck MT, in which the information to be reproduced is recorded, and sub beams S1 and S2 to be respectively irradiated to sub trucks ST1 and ST2, which are adjacently formed on the both sides of the main truck MT, then, the diffraction grating 2 irradiates them to the beam splitter 3, respectively.

Next, the separated main beam M and the sub beams S1 and S2 are permeated through the beam splitter 3, then, the beam splitter 3 irradiates them to the objective lens 4.

Therefore, the objective lens 4 condenses the irradiated main beam M and the sub beams S1 and S2, respectively. Then, the objective lens 4 irradiates the main beam M to the main truck MT, irradiates the sub beam S1 to the sub truck ST1 and irradiates the sub beam S2 to the sub truck ST2, respectively. In this time, an optical spot SPM by the main beam M is formed on an irradiation position on the main truck MT, an optical spot SP1 by the sub beam S1 is formed on an irradiation position on the sub truck ST1 and an optical spot SP2 by the sub beam S2 is formed on an irradiation position on the sub truck ST2. In this case, a separation angle of respective optical beams in the diffraction grating 2 are adjusted so that the optical spots SPM, SP1 and SP2 are arranged in alignment.

Next, the reflection light from respective optical disks DK of the main beam M, the sub beam S1 and the sub beam S2 is condensed by the beam splitter 3 via a backlight path of the original main beam M, the sub beam S1 and the sub beam S2. In this case, by the reflection from the optical disk DK, faces of polarization of the reflection lights of the main beam M, the sub beam S1 and the sub beam S2, respectively, from the optical disk DK, are rotated by a slight angle.

Therefore, the beam splitter 3 reflects the reflection lights, of which faces of polarization are rotated, respectively, in turn and separately irradiates these reflection lights to the photo detector 5 for each reflection light.

Then, the photo detector 5 separately receives the foregoing three reflection lights, respectively, and generates the corresponding three detected signals Smain, Ssub1 and Ssub2 to output them to the high pass filters F1 to F3, respectively. In this time, the detected signal Smain corresponds to the reflection light of the main beam M, the detected signal Ssub1 corresponds to the reflection light of the sub beam S1 and the detected signal Ssub corresponds to the reflection light of the sub beam S2.

After that, respective high pass filters F1 to F3 only make components not less than a predetermined frequency band in the detected signals Smain, Ssub1 and Ssub2, respectively, pass through (in other words, cutting off the direct current components included in the detected signals Smain, Ssub1 and Ssub2, respectively) and output them to the A/D converters 8 to 10 as the detected signals Smain', Ssub1' and Ssub2', separately.

Alternatively, upon reproducing the information according to the embodiment, in order to decrease variance of a reproducing signal caused by variance of the reflection rate of the optical disk DK, it is effective to cut off the direct current components by using the foregoing high pass filters F1 to F3.

After that, respective A/D converters 8 to 10 digitizes the detected signals Smain, Ssub1 and Ssub2, respectively, and generates digital detected signals Sdm, Sdb1 and Sdb2, respectively, to separately output them to the signal processing unit 6.

Next, the signal processing unit 6 removes the cross talk, which is included in the digital detected signal Sdm by using the digital detected signals Sdm, Sdb1 and Sdb2. Then, the signal processing unit 6 generates a removing signal Sp to output it to the decoding processing unit 7.

Further, the decoding processing unit 7 applies a predetermined decoding processing to the removing signal Sp, from which the cross talk is removed, generates a reproducing signal Sout in response to the information, which is recorded in an optical disk, to output the generated signal Sout to an outside monitor device or a speaker or the like (not illustrated).

Next, a detailed structure and the operation of the signal processing unit 6 for performing the cross talk removing processing according to the present invention will be explained with reference to FIG. 3 and FIG. 4.

Figure 3:
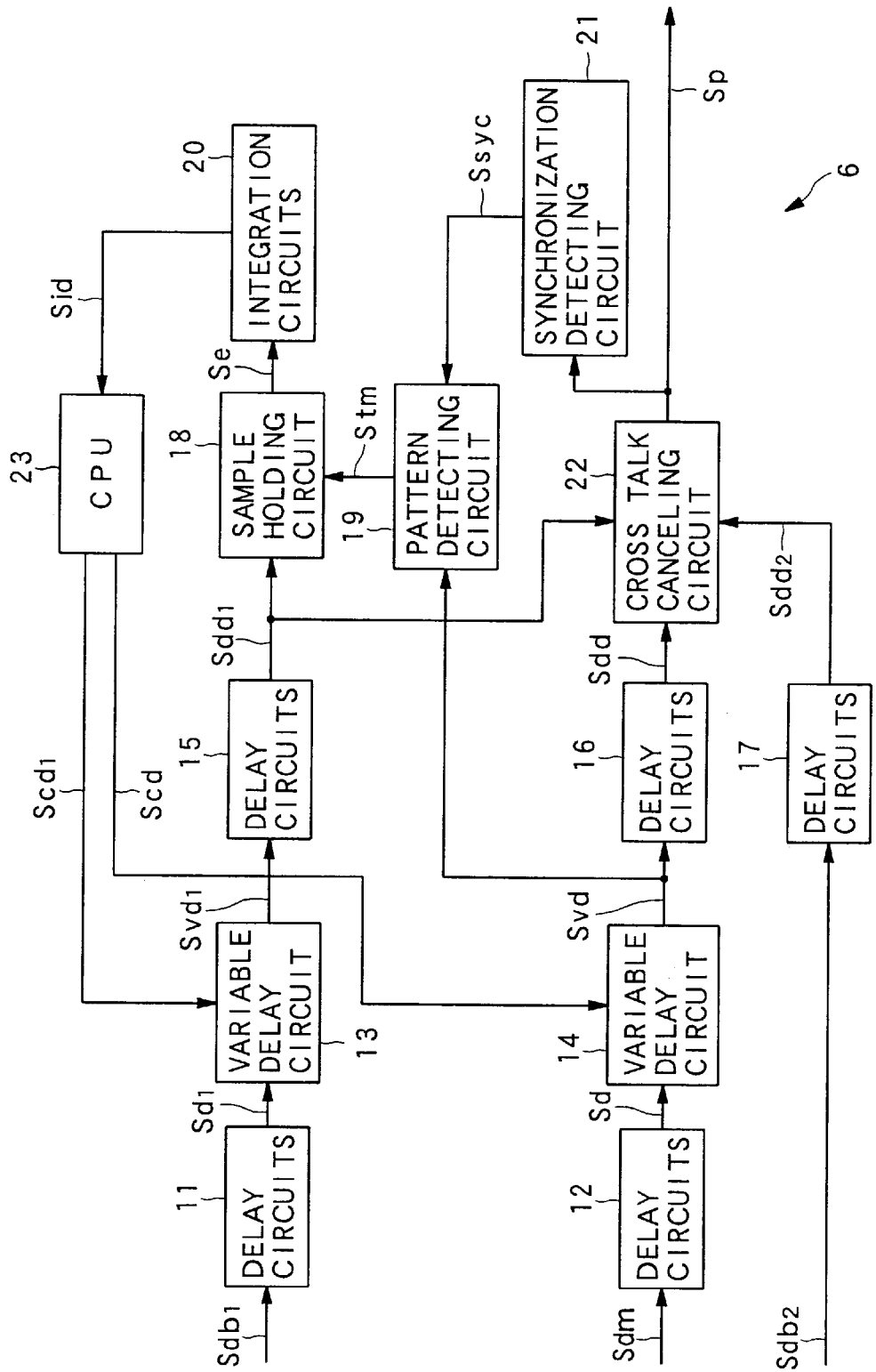
FIG. 3 is a block diagram for illustrating a schematic structure of a signal processing unit according to the embodiment of the present invention.

FIG. 3 is a block diagram for illustrating a detailed structure of the foregoing signal processing unit 6 and FIG. 4 is a diagram for explaining the operation thereof.

As shown in FIG. 3, the signal processing unit 6 according to the embodiment is structured by delay circuits 11, 12, 15, 16 and 17, of which delay amounts are fixed, variable delay circuits 13 and 14 as a delay device, of which delay amount is variable, a sample holding circuit 18 as a holding device, a pattern detecting circuit 19 as an extracting device, a integration circuit 20 as an averaging device, a synchronization detecting circuit 21, a cross talk canceling circuit 22 as a removing device and a CPU 23 as a calculating device.

In the next place, the detailed operation will be explained.

The delay circuit 11 delays the digital detected signal Sdb1 by a predetermined and fixed delay amount D1 and generates a delay detected signal Sd1 to output it to the variable delay circuit 13.

In parallel with this, the delay circuit 12 delays the digital detected signal Sdm by a predetermined and fixed delay amount D0 and generates a delay detected signal Sd to output it to the variable delay circuit 14.

In this case, the delay amounts D1 and D0 in respective delay circuits 11 and 12 are fixedly set in advance as the delay amount in order to delay the digital detected signal Sdb1 and the digital detected signal Sdm so that a line connecting respective optical spots and the moving (rotating) direction of the optical disk DK are orthogonal each other for processing a signal on the basis of the above digital detected signal Sdb2 corresponding to the optical spot SP2, when it is assumed that both of the spacing between the optical spot SPM and the optical spot SP1 and spacing between the optical spot SPM and the optical spot SP2, which are respectively shown in FIG. 1, are equal and fixed (in other words, this case corresponds to a conventional technology in the present invention).

Next, the variable delay circuit 13 adjusts the delay amount in the delay detected signal Sd1 in association with variance in respective spacing between the above described respective optical spots on the basis of a control signal Scd1 from the CPU 19 to be described later, generates an adjusted detected signal Svd1 and outputs it to the delay circuit 15.

Additionally, the delay circuit 15 further delays the adjusted detected signal Svd1 by a predetermined and fixed delay amount D and generates a re-delay detected signal Sdd1 to output it to the sample holding circuit 18 and the cross talk canceling circuit 22.

In this case, the present fixed delay amount D is set in advance as a delay amount, which is necessary for removing a cross talk in practice in the cross talk canceling circuit 22 to be described later.

In parallel with this, the variable delay circuit 14 adjusts the delay amount in the delay detected signal Sd in association with variation in respective spacing between the above respective optical spots on the basis of a control signal Scd to be described later from the CPU 23, generates an adjustment detected signal Svd and outputs it to the delay circuit 16 and the pattern detecting circuit 19.

Then, the delay circuit 16 further delays the adjustment detected signal Svd by the same delay amount as the delay amount D in the above described delay circuit 15, generates a re-delay detected signal Sdd and outputs it to the cross talk canceling circuit 22.

On the other hand, the delay circuit 17 delays the input digital detected signal Sdb2 by the same delay amount as the delay amount D in the above described delay circuits 15 and 16, generates a delay detected signal Sdd2 and outputs it to the cross talk canceling circuit 22.

Thus, the cross talk canceling circuit 22 removes the cross talk components in association with the re-delay detected signal Sdd1 and delay detected signal Sdd2, which are included in the re-delay detected signal Sdd, respectively, on the basis of the foregoing re-delay detected signal Sdd1 and delay detected signal Sdd2. Then, the cross talk canceling circuit 22 generates the above removing signal Sp to output it to the synchronization detecting circuit 21 and the above decoding processing unit 7.

In parallel with the above described respective operations, the synchronization detecting circuit 21 generates a synchronization timing signal Ssyc indicating a timing of a synchronization signal (sync signal), which is included in the removing signal Sp, to output it to the pattern detecting circuit 19.

Therefore, the pattern detecting circuit 19 generates a zero cross signal Stm indicating a zero cross timing in the above adjustment detected signal Svd on the basis of the foregoing synchronization timing signal Ssyc and outputs it to the sample holding circuit 18.

Then, the sample holding circuit 18 samples and holds a data value of the above re-delay detected signal Sdd1, which is input at the same timing as the zero cross timing in the adjustment detected signal Svd on the basis of the foregoing zero cross signal Stm, generates a hold signal Se indicating this data value and outputs the generated hold signal Se to the integration circuit 20.

In this case, a data value in the hold signal Se includes a component in association with the information originally recorded in the sub truck ST1 and a component of the cross talk CTmain (referred to a component represented a reference numeral "e" in FIG. 1B) in the detected signal Ssub1 obtained from the reflection light of the sub beam S1, which was explained in the above principle explanation.

In the next place, the integration circuit 20 multiplies the above hold signal Se with a predetermined coefficient, integrates the hold signal Se for a time frame (more specifically, for example, a time frame for 200 pieces of the zero cross samples in the adjusted detected signal Svd1) and average it. Then, the integration circuit 20 removes a component in association with the information originally recorded in the sub track ST1 from the hold signal Se to generate an error signal Sid and outputs it to the CPU 23.

In this case, the error signal Sid includes the error Δd of the delay amount (refer to FIG. 1B) in the delay processing for the detected signal Ssub1 (the delay processing by the delay circuits 11 and 15 and the variable delay circuit 13).

Figure 4A:
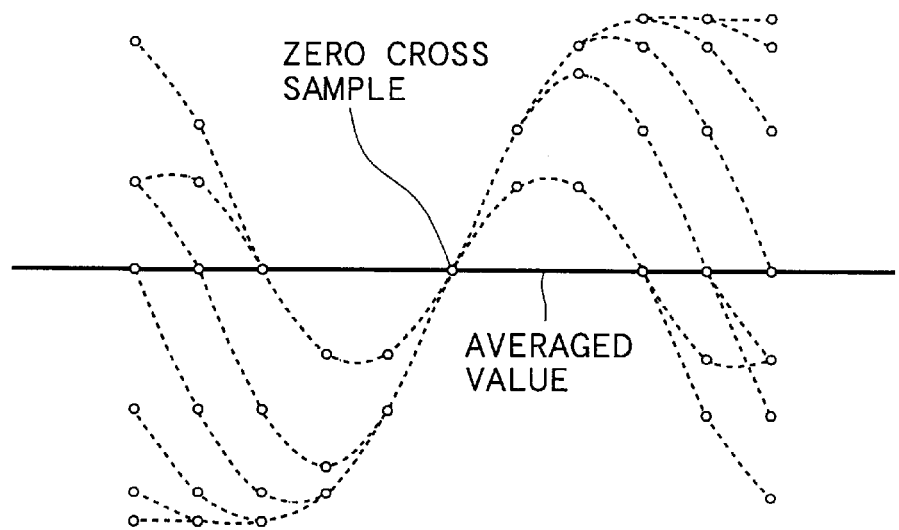
FIG. 4A is a waveform diagram of an eye pattern for illustrating the operation of the signal processing unit according to the embodiment of the present invention.

Further, as shown in FIG. 4A, in the case that the information is recorded by forming a pit P for the optical disk DK, a modulation processing is performed upon originally recording the information so that a sample value for a predetermined time frame is averaged and the averaged value becomes a zero level in order to prevent variance of a reproducing level caused by reason that direct current component is included upon playing this information. That is why it is possible to remove the component in association with the information, which is originally recorded in the sub track ST1 by integrating the above hold signal Se and averaging it for the time frame. Therefore, if the hold signal Se is integrated for the time frame to be averaged, a component in association with the information, which is originally recorded in the sub truck ST1, becomes a zero level. As a result, only a component of the cross talk CTmain in the detected signal Ssub1 is capable of being extracted as the error signal Sid.

Figure 4B:
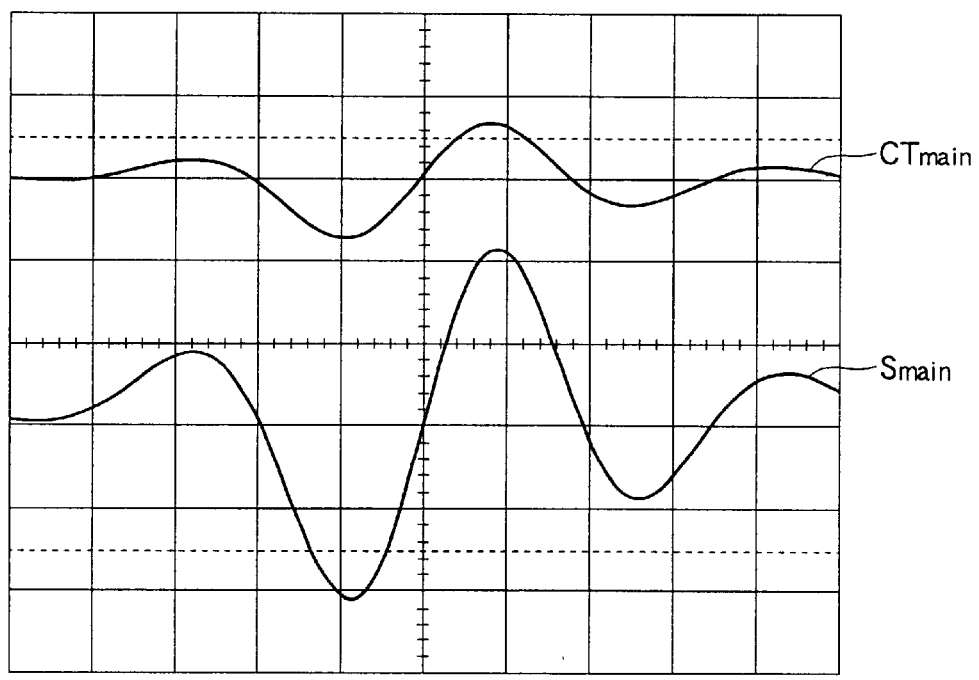
FIG. 4B is a waveform diagram for illustrating an experimental example of the signal processing unit according to the embodiment of the present invention.

Alternatively, considering an actual experimental example on this point, as shown in FIG. 4B, since the cross talk CTmain is generated caused by reason that a portion of the sub beam S1 is irradiated to the main truck MT, a phase of the cross talk CTmain, which is obtained by averaging the detected signal Ssub1 in 2000 times as shown in the embodiment, is identical with a phase of the detected signal Smain, which is detected from the main track MT, and further, a signal level of the cross talk CTmain is obtained by evenly reducing the signal level of the detected signal Smain.

In the next place, the CPU 23 generates the above control signals Scd and Scd1 so as to dissolve the error Δd of the delay amount, which is included in the above error signal Sid, and outputs them to the variable delay circuits 14 and 13, respectively.

In this case, if the error Δd is generated in a direction that the phase is progressing (refer to FIG. 1(A)), the control signal Scd has a content so as to further delay the detected signal Smain by Δd. On one hand, the control signal Scd1 has a content so as to further delay the detected signal Ssub1 by 2×Δd.

On the other hand, if the error Δd is generated in a direction that the phase is delayed (refer to FIG. 1(C)), the control signal Scd has a content so as to further progress the detected signal Smain by Δd. On one hand, the control signal Scd1 has a content so as to further progress the detected signal Ssub1 by 2×Δd.

Then, the delay amount in the variable delay circuits 14 and 13 is controlled within a range of ±Δd or ±2Δd, so that the delay amounts in the detected signals Smain and Ssub1 are correctly adjusted so as to compensate for the variance of spacing between the optical spots SPM, SP1 and SP2 each other. As a result, the re-delayed detected signals Sdd1 and Sdd and the delay detected signal Sdd2 are equivalent to the signals, which are obtained in a state that the optical spots SP1, SPM and SP2 are aligned in a line in parallel with a radial direction of the optical disk DK, so that it is possible to correctly perform the cross talk removing processing in the cross talk canceling circuit 22.

Next, detailed structures and the operations of the variable delay circuits 13 and 14 in the signal processing unit 6 will be explained with reference to FIG. 5.

FIG. 5 is a block diagram for illustrating detailed structures of the variable delay circuits 13 and 14. Additionally, in the variable delay circuit 13 and the variable delay circuit 14, the delay amounts on the basis of the control signal Scd1 or the control signal Scd are only different and the detailed structures thereof are the same, so that on behalf of these variable delay circuit 13 and the variable delay circuit 14, only the variable delay circuit 13 will be explained below.

Figures 5A, 5B:
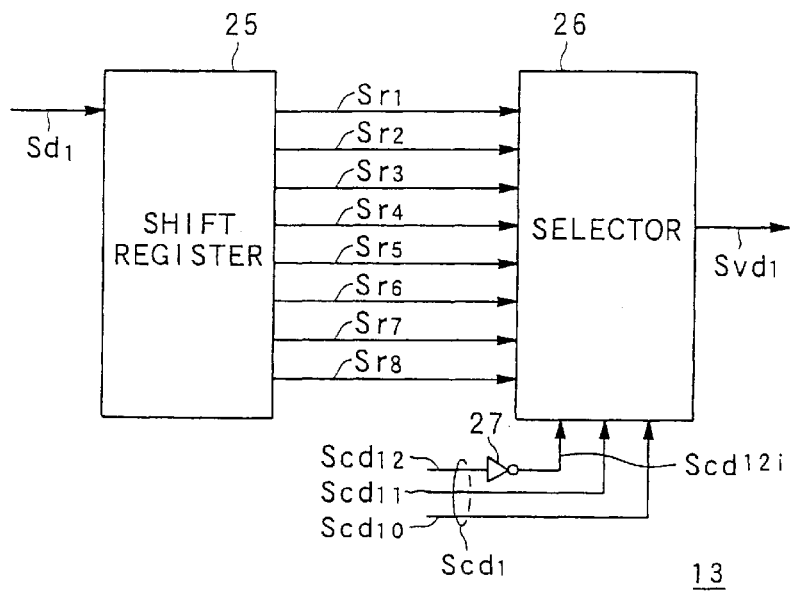
FIG. 5A is a block diagram for illustrating a schematic structure of a variable delay circuit according to the embodiment of the present invention.
FIG. 5B is a diagram for illustrating operation of a variable delay circuit according to the embodiment of the present invention.

As shown in FIG. 5A, the variable delay circuit 13 according to the embodiment is comprised of a shift register 25 having nth number of levels, a selector 26 and an inverter 27.

Next, the operation of the variable delay circuits 13 according to the embodiment will be explained by using FIG. 5B. Additionally, in the following explanation, a case that the above n is "8" will be explained as an example.

At first, the shift register 25 temporally holds the input delay detected signal Sd1, delays this delay detected signal Sd1 by one reference clock in reference clocks to be used for the reproducing processing of the information reproducing apparatus S and outputs the delay detected signal Sd1 to the selector 26 as register signals Sr1, Sr2, ..., Sr8, respectively.

Then, on the basis of the above control signal Scd1, the selector 26 outputs a register signal having the delay amount corresponding to the delay amount (2Δd), which is represented by the control signal Scd1, among respective register signals Sr1, Sr2, ..., Sr8 to the delay circuit 15 as the above adjusted detected signal Svd1.

More specifically, as shown in FIG. 5B, the above control signal Scd1 comprising three bits of the control signals Scd10 to Scd12 (it becomes "−4" to "3" as a value, in the case of using two's complement) is converted into straight indication in the selector 26. In this case, the control signal Scd12 is input in the selector 26 after it is bit-reversed to be the control signal Scd12i in the inverter 27 so as to start the second bit in the bit indication from "0". Alternatively, in this case, the selector 26 functions as a multiplexer. Then, in response to this converted value, the selector 26 selects any register signal as shown in FIG. 3B and outputs it to the delay circuit 15 as the above adjusted detected signal Svd1. Alternatively, if the Δd is 0 in this case, the delay amount to be output from the selector 26 (i.e., a value of the adjusted detected signal Svd1) becomes a neutral point (namely, a point where the delay amount is zero) in the delay changeable range of the variable delay circuit 13.

In this case, the variable delay circuit 13 having a structure shown in FIG. 3 is capable of controlling the delay amount in units of one reference clock.

In the next place, a detailed structure and the detailed operation of the synchronization detecting circuit 21 in the signal processing unit 6 will be explained below.

Figure 6:
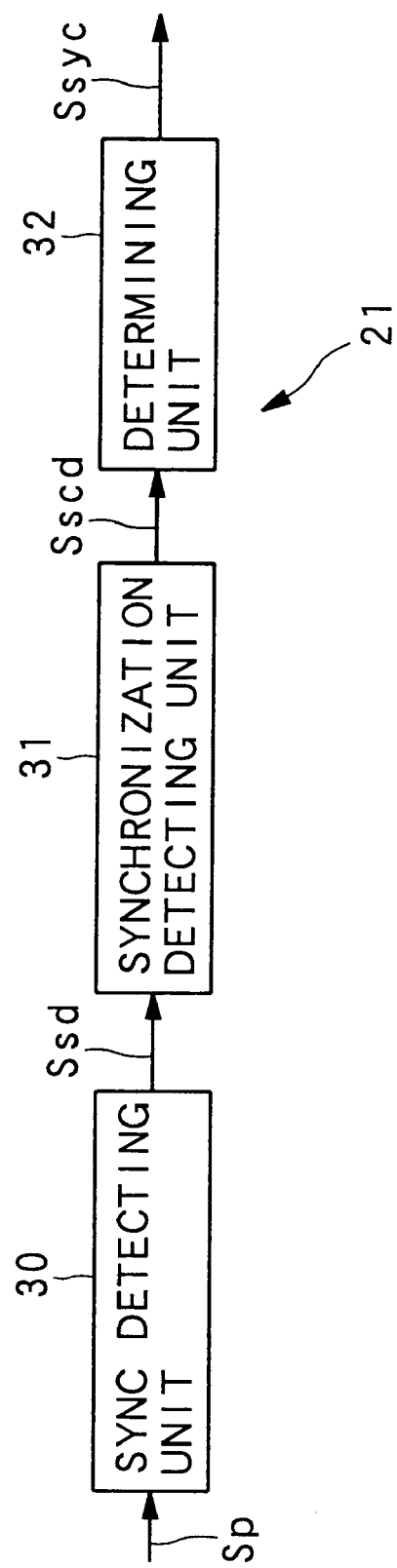
FIG. 6 is a block diagram for illustrating a schematic structure of a synchronization detecting circuit according to the embodiment of the present invention.

FIG. 6 is a block diagram for illustrating the detailed structure of the synchronization detecting circuit 21.

As shown in FIG. 6, the synchronization detecting circuit 21 is comprised of a sync detecting unit 30, a synchronization detecting unit 31 and a determining unit 32.

In the next place, the operation thereof will be explained below.

At first, the sync detecting unit detects the sync signal itself, which is included in the removing signal Sp and generates a sync signal Ssd to output it to the synchronization detecting unit 31.

In the next place, the synchronization detecting unit 31 detects a timing, at which this sync signal Ssd is detected, and generates a synchronization detecting signal Ssd to output it to the determining unit 32.

Therefore, the determining unit 32 determines whether the detection of the sync signal Ssd is repeated in the number of times, which is set in advance, for each unit information in the information recorded in the optical disk DK. Then, if it is certainly repeated by the number of times, the determining unit 32 generates the above synchronization timing signal Ssyc indicating a timing, at which this sync signal Ssd is detected, and outputs it to the pattern detecting circuit 19.

In the next place, a detailed structure and the detailed operation of the pattern detecting circuit 19 in the signal processing unit 6 will be explained by using FIGS. 7 and 8.

Figure 7:
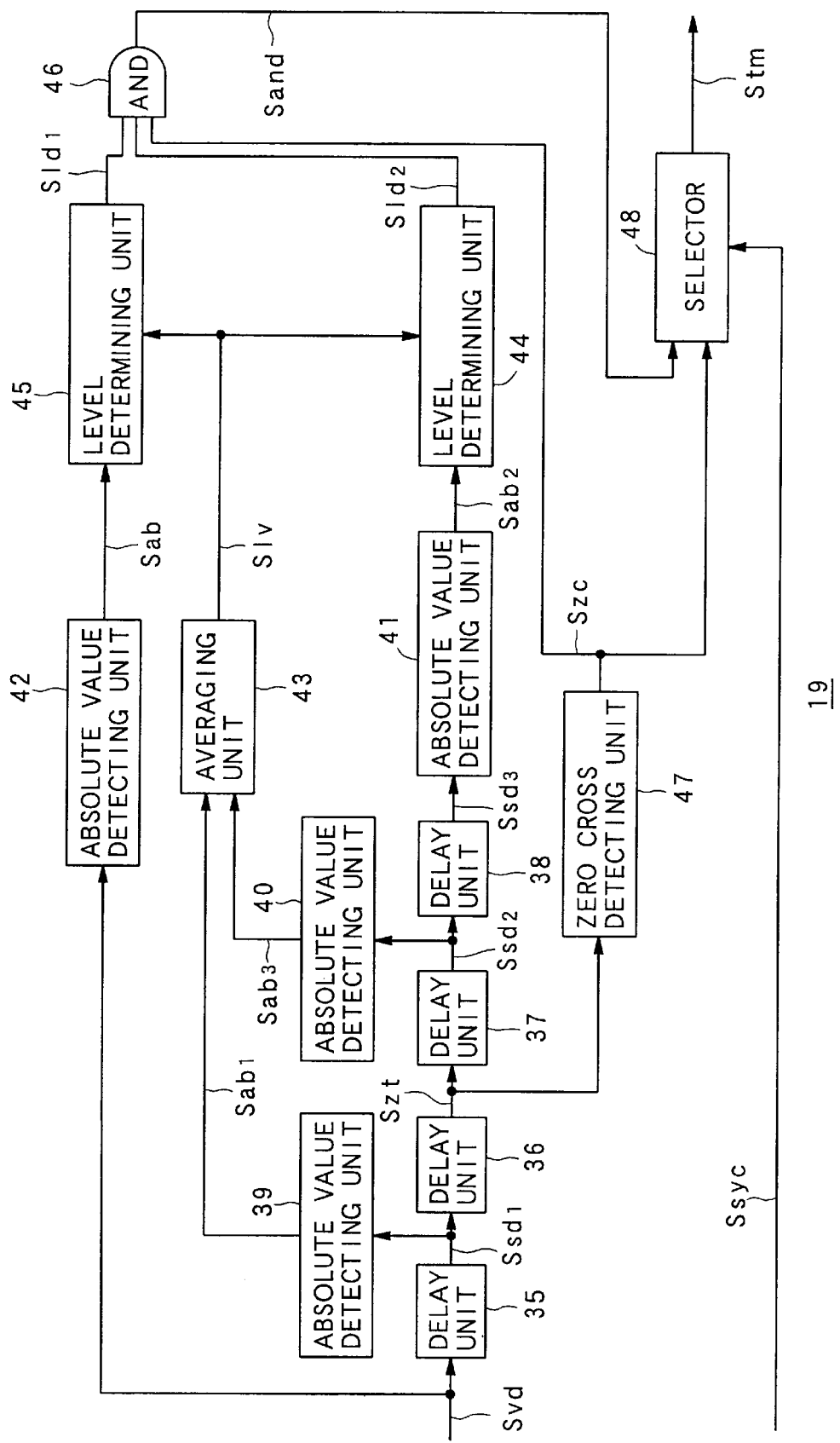
FIG. 7 is a block diagram for illustrating a schematic structure of a pattern detecting circuit according to the embodiment of the present invention.
Figure 8:
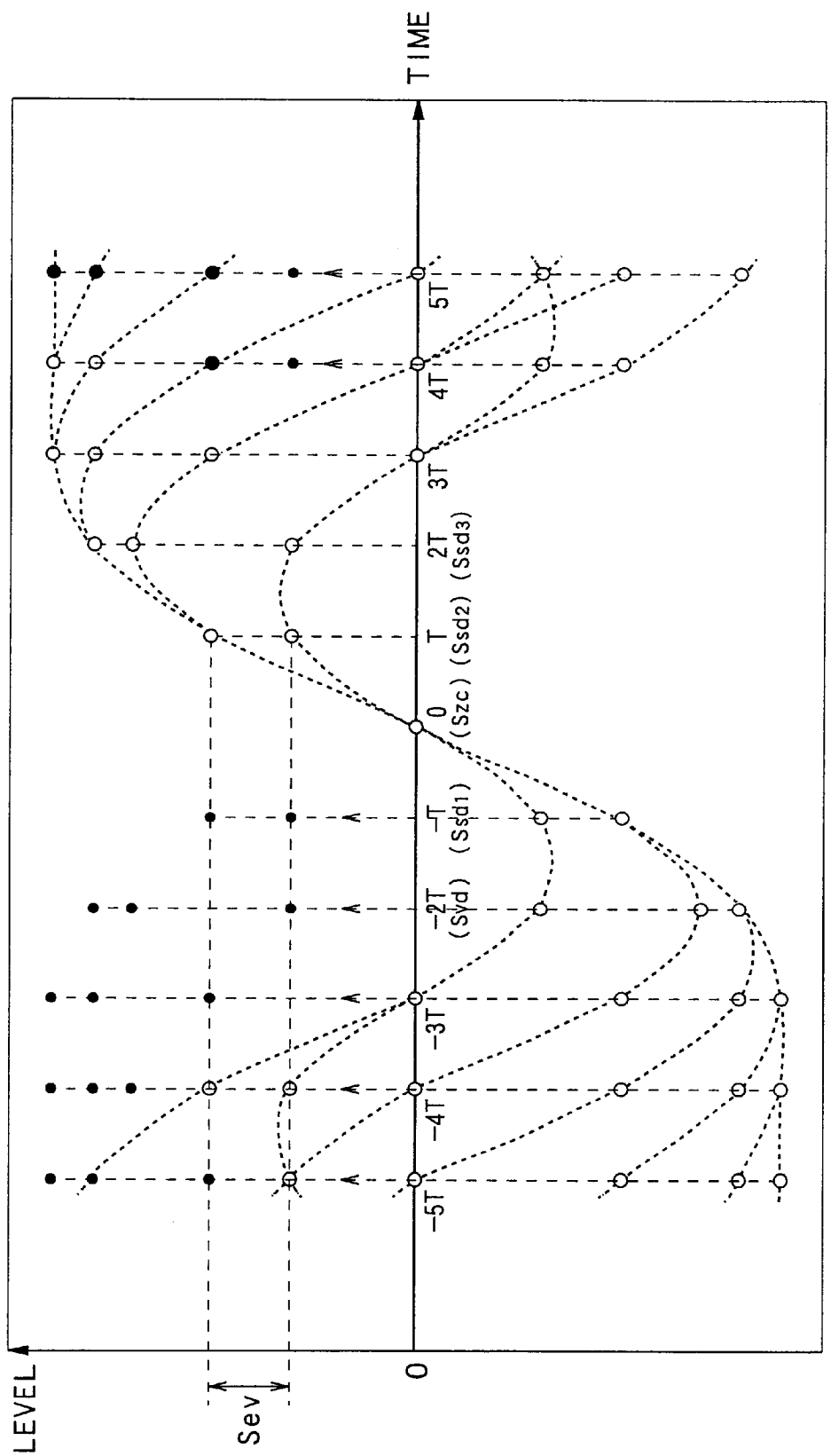
FIG. 8 is a timing chart for illustrating the operation of the pattern detecting circuit according to the embodiment of the present invention.

FIG. 7 is a block diagram for illustrating the detailed structure of the foregoing pattern detecting circuit 19 and FIG. 8 is a timing chart for illustrating the operation thereof.

As shown in FIG. 7, the pattern detecting circuit 19 is comprised of delay units 35, 36, 37 and 38, absolute value detecting units 39, 40, 41 and 42, an averaging unit 43, level determining units 44 and 45, an AND circuit 46, a zero cross detecting unit 47 and a selector 48.

In this case, in the above structure, respective component parts except forte zero cross detecting unit 47 and the selector 48 serve as circuits for generating the above zero cross signal Stm, which is obtained from the pits P other than the shortest pit P in the pits P, which are formed on the main truck MT. This shortest pit P has a length corresponding to three times (3T) of the above one reference clock time frame (hereinafter, this one reference clock time frame is simply referred to as T) in the case that the optical disk DK comprises a CD or a DVD.

In the next place, the detailed operation thereof will be explained below.

At first, the adjustment detected signal Svd, which is output from the above variable delay circuit 14 and input in the pattern detecting circuit 19, is input in the absolute value detecting unit 42 and the delay unit 35.

Further, the delay units 35, 36 and 37 sequentially delay the adjustment detected signal Svd for each above one reference clock (1T), generate delayed signals Ssd1, Ssd2 and Ssd3, respectively, and outputs the delayed signal Ssd1 to the absolute value detecting unit 39 and the delay unit 36, the delayed signal Szt to the delay unit 37 and the zero cross detecting unit 47, the delayed signal Ssd2 to the delay unit 38 and the absolute value detecting unit 40 and the delayed signal Ssd3 to the absolute value detecting unit 41, respectively.

In the next place, the absolute value detecting unit 42 detects the absolute value of the information, which is included in the adjustment detected signal Svd, to output it to the level determining unit 45.

Alternatively, the absolute value detecting units 39 and 40 detect the absolute value of the information, which is included in the delayed signals Ssd1 and Ssd2, generates absolute value signals Sab1 and Sab3, respectively and outputs it to the averaging unit 43.

Further, the absolute value detecting unit 41 detects the absolute value of the information, which is included in the delayed signal Ssd3, and generates an absolute value signal Sab2 to output it to the level determining unit 44.

Then, the averaging unit 43 calculates an average value of an absolute value included in the absolute value signal Sab1 and an absolute value included in the absolute value signal Sab3. Then, the averaging unit 43 generates an average value signal S1v to output it to the level determining units 44 and 45.

Therefore, the level determining unit 45 generates a determination signal Sld1 with respect to the above absolute value signal Sab to output it to one input terminal of the AND circuit 42. This determination signal Sld1 becomes "HIGH" at a timing, at which an absolute value signal Sab including the information having a value larger than the average value, indicated by the average signal S1v, is input.

On one hand, the level determining unit 44 generates a determination signal Sld2 with respect to the absolute value signal Sab2 to output it to another input terminal of the AND circuit 42. This determination signal Sld2 becomes "HIGH" at a timing, at which an absolute value signal Sab 2 including the information having a value larger than the average value, indicated by the average signal S1v, is input.

On the other hand, the zero cross detecting unit 47 detects a zero cross timing in the delayed signal Szt and generates a detected signal Szc, which becomes "HIGH" at the zero cross timing to output it to one terminal of the selector 48 and further another input terminal of the AND circuit 42.

Therefore, the AND circuit 42 generates an AND signal Sand, which becomes "HIGH" at a timing such that all of the above detected signal Szc and the determination signals Sld1 and Sld2 become "HIGH", to output it to the selector 48.

Then, the selector 48 selects the above AND signal Sand on the basis of the above synchronization timing signal Ssync for a predetermined time frame on and after at first the synchronization timing signal Ssync is input after reproducing of the information is started (for example, a time frame corresponding to 10 pieces of sync frames (14880T) as an information unit in the information, which is recorded in the optical disk DK) and outputs it to the sample holding circuit 18 as the above zero cross signal Stm. At the same time, after the time frame, the selector 48 selects the above detected signal Szc and outputs it to the sample holding circuit 18 as the above zero cross signal Stm. Therefore, during the above first time frame after reproducing of the information is started, as the zero cross signal Stm, a zero cross timing, which is detected by using other pits P except for the above described shortest pit (a pit P of which length is 3T), is indicated. On one hand, after the above time frame passes over, the zero cross timing is indicated, which is detected by using all pits P.

In this case, under an unstable state when reproducing of the information is started, there is a case such that a large error is included in the delay amount. In this case, if the zero cross timing is detected by using the above shortest pit, this pit deviates from a capture range for adjusting the delay amount. As a result, the delay amount is not capable of being adjusted, so that it is needed to enlarge the capture range by using a longer pit. That is why the zero cross signal Stm is generated in this way.

In the next place, the operation of the component parts except for the zero cross detecting unit 47 and the selector 48 in the pattern detecting circuit 19 will be entirely explained with reference to FIG. 8. Alternatively, FIG. 8 illustrates a RF signal waveform (so-called eye pattern) of an adjustment detected signal Svd in the case that a timing, at which the delayed signal Szt as a base for detecting a zero cross timing in the pattern detecting circuit 19 is generated, is defined as a reference timing (shown by a reference numeral 0 in FIG. 8) when the optical disk DK is a CD or a DVD. Further, white circles shown in FIG. 8 indicate sampling values in the eye pattern.

At first, as described above, the delay units 35, 36, 37 and 38 sequentially delay the adjustment detected signal Svd in one reference clock (1T) to generate delayed signals Ssdl, Szt, Ssd2 and Ssd3, respectively, so that the delayed signal Ssd3 comprises the adjustment detected signal Svd, which is input at a timing prior to the delayed signal Szt by 2T (referred to a reference numeral (Ssd3) in FIG. 8), the delayed signal Ssd2 comprises the adjustment detected signal Svd, which is input at a timing prior to the delayed signal Szt by 1T (referred to a reference numeral (Ssd2) in FIG. 8) and the delayed signal Ssd1 comprises the adjustment detected signal Svd, which is input at a timing after to the delayed signal Szt by 1T (refer to a reference numeral (Ssd1) in FIG. 8). Further, the adjustment detected signal Svd itself is input at a timing after the delayed signal Szt by 2T (refer to a reference numeral (Svd) in FIG. 8).

In the next place, respective absolute value detecting units 39 to 42 detect an absolute value of a signal to be input, so that, as shown by black circles in FIG. 8, sample values at respective timings are also made into absolute values.

Further, the averaging unit 43 detects the average value of a sample value at a timing before and after the above reference timing by 1T. As a result, the average value of two sample values corresponding to a timing of ±T as shown in FIG. 8 is output as the above average value signal Slv.

In this case, as shown in FIG. 8, a value capable of being taken as a sample value at the timing of ±T comprises any one of an absolute value of the adjustment detected signal Svd corresponding to a pit P having a length of 3T or an absolute value of the adjustment detected signal Svd corresponding to respective pits P having a length not less than 4T. Therefore, a value of the above average value signal Slv takes the minimum value in the case that both of the pit P just before the reference timing and the pit P just after the reference timing are the above shortest pit. Further, a value of the above average value signal Slv takes the maximum value in the case that both of the pit P just before the reference timing and the pit P just after the reference timing are the pits other than the above shortest pit (refer to a reference numeral Slv in FIG. 8).

Then, the lever determining unit 45 compares the absolute value signal Sab obtained by making the adjustment detected signal Svd into the absolute value (corresponding to a timing of −2T) with the average value included in the average value signal Slv. In this case that the absolute value signal Sab comprises a signal, which is obtained from the pits P other than the shortest pit, as shown in FIG. 8, a value of the absolute value signal Sab always exceeds the average value, which is included in the average value signal Slv. In other words, this value is not more than the average value, which is included in the average value signal Slv, only if the absolute value signal Sab comprises a signal, which is obtained from the shortest pit.

Accordingly, the determination signal Sld1 is "HIGH", a value of the absolute value signal Sab always has a value in association with the pits P other than the shortest pit.

In the same way, the lever determining unit 44 compares the absolute value signal Sab2 obtained by making the delayed signal Ssd3 into the absolute value (corresponding to a timing of +2T) with the average value included in the average value signal Slv. In this case that the foregoing absolute value signal Sab2 comprises a signal, which is obtained from the pits P other than the shortest pit, as shown in FIG. 8, a value of the absolute value signal Sab2 always exceeds the average value, which is included in the average value signal Slv. In other words, this value is not more than the average value, which is included in the average value signal Slv, only if the absolute value signal Sab2 comprises a signal, which is obtained from the shortest pit.

Accordingly, when the determination signal Sld2 is "HIGH", a value of the absolute value signal Sab necessarily has a value in association with pits P other than the shortest pit.

According to the above described respective operations, the AND circuit 42 outputs the AND signal Sand, which becomes "HIGH"0 only at a timing such that all of the determination signals Sld1 and Sld2 and the detected signal Szc are "HIGH". As a result, a timing such that the above AND signal is output is a zero cross timing, which is detected by using the pits P other than the shortest pit.

Figure 9:
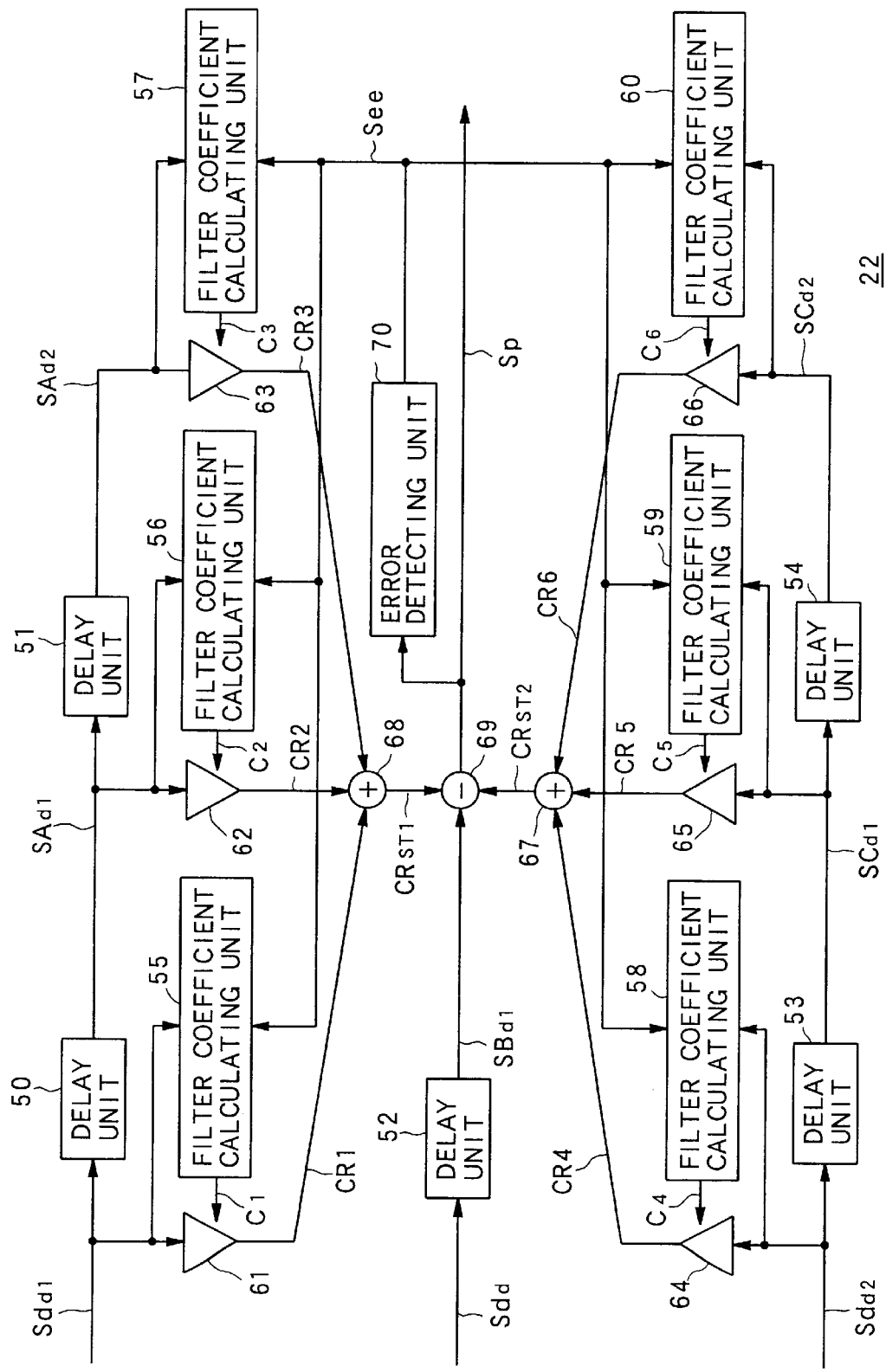
FIG. 9 is a block diagram for illustrating a schematic structure of a cross talk cancel circuit according to the embodiment of the present invention.

In the next place, a detailed structure and the detailed operation of the cross talk canceling circuit 22 in the signal processing unit 6 with reference to FIG. 9.

Alternatively, the cross talk canceling circuit 22 to be described below applies the adaptive signal processing on the basis of an adaptive algorithm, for example, a LMS (least mean square) algorithm to the above re-delay detected signal Sdd1, the delay detected signal Sdd2 and the re-delay detected signal Sdd, which are read from the above main truck MT, the sub truck ST1 and the sub truck ST2, respectively, so that the cross talk canceling circuit 22 generates the removing signal Sp, from which the cross talk is removed.

FIG. 9 is a block diagram for illustrating a detailed structure of the cross talk canceling circuit 22.

As shown in FIG. 9, the cross talk canceling circuit 22 is comprised of delay units 50, 51, 52, 53 and 54, filter coefficient calculating units 55, 56, 57, 58, 59 and 60, multipliers 61, 62, 63, 64, 65 and 66, adders 67 and 68, a subtracter 69 and an error detecting unit 70.

In the next place, the detailed operation thereof will be described below.

At first, the re-delay detected signal Sdd1, which is input in the cross talk canceling circuit 22, is input in the delay unit 50, the multiplier 61 and the filter coefficient calculating unit 55, the delay detected signal Sdd2 is input in the delay unit 53, the multiplier 64 and the filter coefficient calculating unit 58 and the re-delay detected signal Sdd is input in the delay unit 52, respectively.

Then, the filter coefficient calculating unit 55 obtains a filter coefficient $C_1$, on the based on an error value e, which is included in an error signal See, which is output from the above described re-delay detected signal Sdd1 and the error detecting unit 70 to be described later to out put is to the multiplier 61.

Therefore, the multiplier 61 defines a result of multiplying respective sample values in the re-delay detected signal Sdd1 by the above described filter coefficient $C_1$ as a cross talk CR1, which is a portion of a cross talk corresponding to a sub truck ST1 included in the re-delay detected signal Sdd, and the multiplier 61 outputs this to the adder 68.

In the next place, the delay unit 50 delays the re-delay detected signal Sdd1 by 1T and the delay unit 50 outputs it to the filter coefficient calculating unit 56, the multiplier 62 and the delay unit 51, respectively, as a delayed signal $SA_{d1}$.

Therefore, the filter coefficient calculating unit 56 obtains a filter coefficient $C_2$ on the basis of the delayed signal $SA_{d1}$, and the error value e to output it to the multiplier 62.

Then, the multiplier 62 defines a result of multiplying respective sample values in the delayed signal $SA_{d1}$, by the above described filter coefficient $C_2$ as a cross talk CR2, which is a portion of a cross talk corresponding to a sub truck ST1 included in the re-delay detected signal Sdd, and the multiplier 62 outputs this to the adder 68.

Then, the delay unit 51 delays the delayed signal $SA_{d1}$ by 1T to output it to the filter coefficient calculating unit 57 and the multiplier 63, respectively, as a delayed signal $SA_{d2}$.

Therefore, the filter coefficient calculating unit 57 obtains a filter coefficient $C_3$ on the basis of the delayed signal $SA_{d2}$ and the error value e to output it to the multiplier 63.

Then, the multiplier 63 defines a result of multiplying respective sample values in the delayed signal $SA_{d2}$ by the above described filter coefficient $C_3$ as a cross talk CR3, which is a further portion of a cross talk corresponding to a sub truck ST1 included in the re-delay detected signal Sdd, and the multiplier 63 outputs this to the adder 68.

Therefore, the adder 68 defines a result of adding each of the cross talks CR1 to CR3 as a cross talk $CR_{ST1}$ corresponding to the sub truck ST1 included in the re-delay detected signal Sdd, and the adder 68 outputs this to the subtracter 69.

On the other hand, the filter coefficient calculating unit 58 obtains a filter coefficient $C_4$ on the basis of the delay detected signal Sdd2 and the error value e to output it to the multiplier 64.

Therefore, the multiplier 64 defines a result of multiplying respective sample values in the delay detected signal Sdd2 by the above described filter coefficient $C_4$ as a cross talk CR4, which is a portion of a cross talk corresponding to a sub truck ST2 included in the re-delay detected signal Sdd and the multiplier 64 outputs it to the adder 67.

Then, the delay unit 53 delays the re-delay detected signal Sdd2 by 1T to output them to the filter coefficient calculating unit 59, the multiplier 65 and the delay unit 54, respectively, as a delayed signal $SC_{d1}$.

Therefore, the filter coefficient calculating unit 59 obtains a filter coefficient $C_5$ on the basis of the delay signal $SC_{d1}$, and the error value e to output it to the multiplier 65.

Then, the multiplier 65 defines a result of multiplying respective sample values in the delay signal $SC_{d1}$ by the above described filter coefficient $C_5$ as a cross talk CR5, which is a portion of a cross talk corresponding to a sub truck ST2 included in the re-delay detected signal Sdd and the multiplier 65 outputs it to the adder 67.

Then, the delay unit 54 further delays the delay signal $SC_{d1}$ by 1T to output them to the filter coefficient calculating unit 60 and the multiplier 66, respectively, as a delayed signal $SC_{d2}$.

therefore, the filter coefficient calculating unit 60 obtains a filter coefficient $C_6$ on the basis of the delay signal $SC_{d2}$ and the error value e to output it to the multiplier 66.

Then, the multiplier 66 defines a result of multiplying respective sample values in the delay signal $SC_{d2}$ by the above described filter coefficient $C_6$ as a cross talk CR3, which is a further portion of a cross talk corresponding to a sub truck ST1 included in the re-delay detected signal Sdd and the multiplier 66 outputs it to the adder 68.

Therefore, the adder 68 defines a result of adding each of the cross talks CR4 to CR6 as a cross talk $CR_{ST2}$ corresponding to the sub truck ST2 included in the re-delay detected signal Sdd, and the adder 68 outputs this to the subtracter 69.

On one hand, the delay unit 52 further delays the re-delay detected signal Sdd by 1T to output it to the foregoing subtracter 69 as a delayed signal $SB_{d1}$.

therefore, the subtracter 69 subtracts the cross talk $CR_{ST1}$, and the cross talk $CR_{ST2}$, respectively, from the delayed signal $SB_{d1}$ to output it to the decoding processing unit 7 and the error detecting unit 70 as the removing signal Sp.

In the next place, the error detecting unit 70 detects errors between respective sample values in the removing signal Sp and respective ideal sample values, which can be taken as these respective sample values, generates an error signal See including the errors with defining this as the foregoing error value e and supplies it to the foregoing filter coefficient calculation circuits 55 to 60, respectively.

More specifically, for example, the error detecting unit 70 extracts a central sample when its value shifts from positive to negative or from negative to positive in three continuous sample value rows in the removing signal Sp, namely, a zero cross sample. Then, this extracted sample has an error with respect to a real "0" value as the error value e.

Then, each of the filter coefficient calculating units 55 to 60 updates each of respective filter coefficients $C_1$, to $C_6$ so that this error value e is converged to "0".

As described above, according to the operation of the signal processing unit 6, a zero cross waveform in the digital detected signal Sdm is compared with the waveform of the present timing in the digital detected signals Sdb1 so as to calculate the delay amount with respect to the digital detected signals Sd1 and Sdm. Therefore, even if the wave length of respective optical beams, which are irradiated on respective trucks, are changed, the necessary delay amount is simply and accurately calculated, so that it is possible to delay the digital detected signals Sd1 and Sdm.

Alternatively, during a predetermined time frame when the information playing is started and the reproducing processing becomes unstable, a zero cross timing is detected by using the waveform of the digital detected signal Sdm, so that the foregoing capture range is enlarged and it is possible that the present delay amount is calculated.

Further, after the present predetermined time frame passes over, a zero cross timing is detected by using the waveform of the digital detected signal Sdm, which is capable of being obtained all pits P, to calculate the delay amount, so that it is possible to calculate the present delay amount more accurately.

Further, since the variable delay circuits 13 and 14 are structures so as to include a shift register 25, it is possible to simply realize the variable delay circuits 13 and 14.

Alternatively, since the main truck MT comprises a truck, in which the information to be read by the main truck MT is recorded, it is possible to calculate the delay amount so that the information is capable of being more accurately read.

According to the above described embodiment, the mutual adjoining trucks comprise the main truck MT and the sub trucks ST1 and ST2, respectively. However, other than this, the sub trucks ST1 and ST2 may comprise the trucks which are separated from the main truck MT by several trucks so as to effect the above described cross talk removing processing.

Further, according to the above described embodiment, within a time frame when playing of the information is started and the reproducing processing becomes unstable, the zero cross timing is detected by using the waveform of the digital detected signal Sdm, which is obtained from the pits P except for the shortest pit. However, other than this, it is also possible that the zero cross timing is structured so as to detect the zero cross timing by using the waveform of the digital detected signal Sdm, which is obtained from spacing between the bits on the optical disk DK except for a part in which the length of the spacing between the pits becomes the shortest.

(III) A Modified Embodiment

In the next place, a modified embodiment in the present invention will be explained with reference to FIG. 10 to FIG. 18. Further, in FIGS. 10 to 16, the same component parts as those in FIG. 6 according to the embodiment will be given the same reference numerals and the detailed explanation thereof is herein omitted.

The present invention is capable of being applied to a signal processing unit having various structures other than the signal processing unit 6 according to the above described embodiment.

Figure 10:
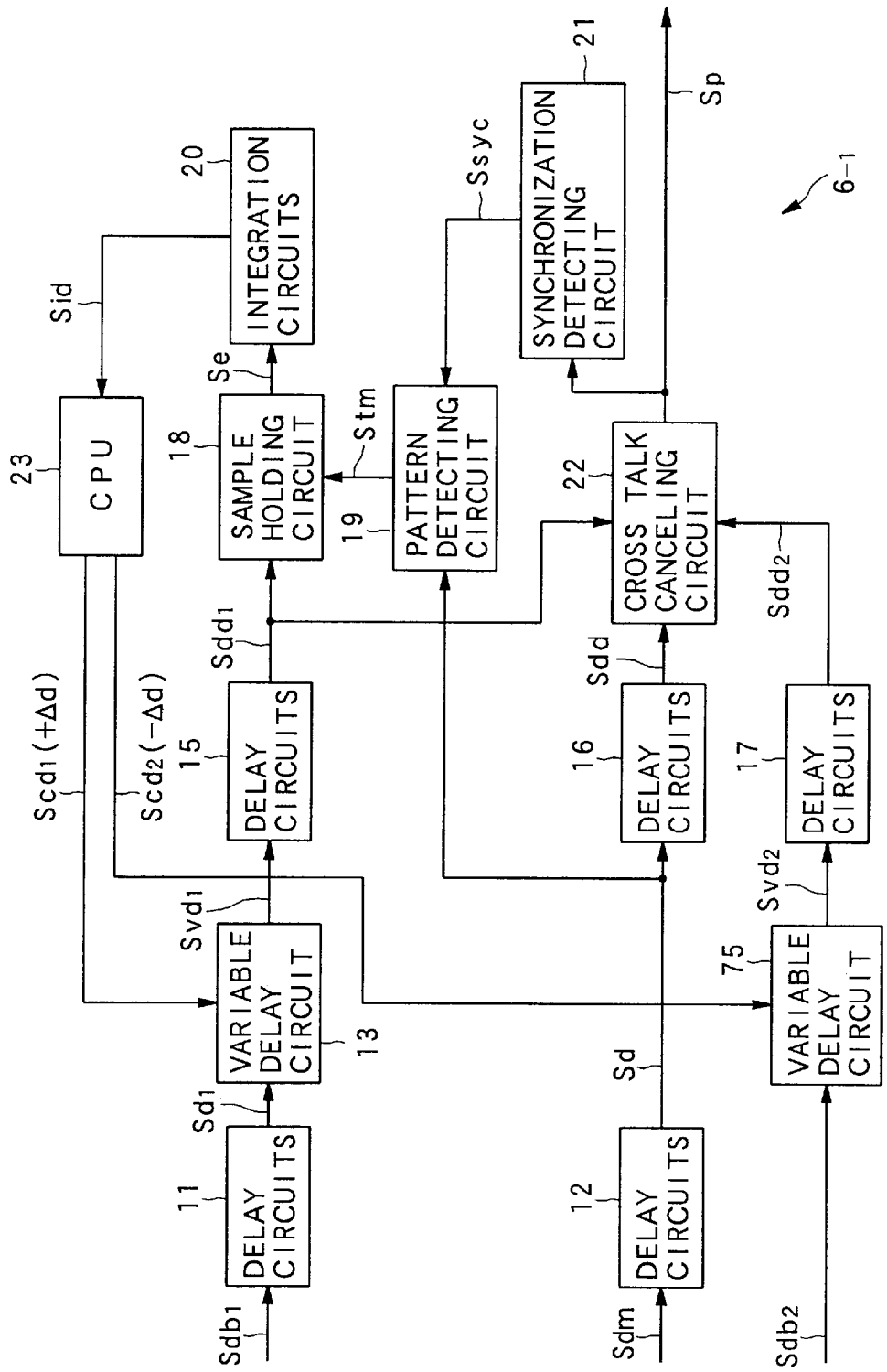
FIG. 10 is a block diagram for illustrating a schematic structure of a signal processing unit according to the first modified embodiment of the present invention.

In other words, as shown in FIG. 10 comprising a block diagram for illustrating a schematic structure of a signal processing unit $6_{-1}$ according to the first modified embodiment, it is also possible that a variable delay circuit 75 (having a structure as same as those of the variable delay circuits 13 and 14) for delaying the digital detected signal Sdb2 with the delay amount being changeable on the basis of the control signal Scd2 from the CPU 23 in place of the variable delay circuit 14 according to the present invention.

In this case, with respect to the delay mount in the variable delay circuits 13 and 75, if the delay amount in the variable delay circuit 13 is defined as $\Delta d$, the present delay amount is controlled while maintaining a relation such that the delay amount in the variable delay circuit 75 is $-\Delta d$.

Figure 11:
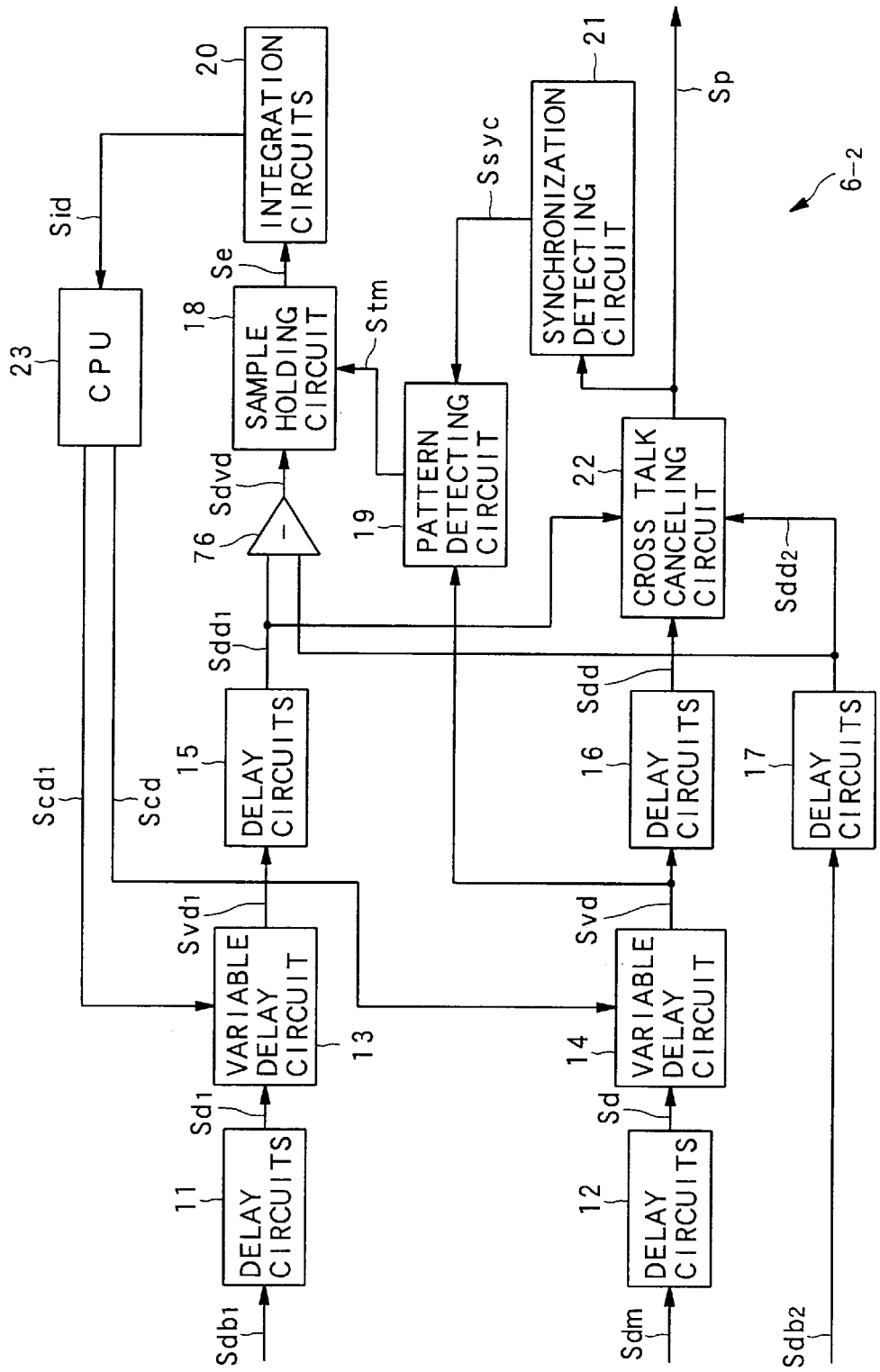
FIG. 11 is a block diagram for illustrating a schematic structure of a signal processing unit according to the second modified embodiment of the present invention.

In the next place, as shown in FIG. 11 comprising a block diagram for illustrating a schematic structure of a signal processing unit $6_{-2}$ according to the second modified embodiment, it is also possible that a signal to be sample-held is generated in a sample hold circuit 18 by using both of the delay detected signal Sd1 and Sd2 according to the present invention.

In this case, as shown in FIG. 11, in addition to a structure of the signal processing circuit 6, the subtracter 76 for calculating the deference between the re-delay detected signal Sdd1 and the delay detected signal Sdd2 is structured such that a subtraction signal Sdvd for illustrating a subtracting result in this subtracter 76 is sampled and held in the sample holding circuit 18 on the basis of the zero class signal Stm.

According to this signal processing unit $6_{-2}$ according to the second modified embodiment, it is possible to calculate the error of the delay amount more accurately.

Figure 12:
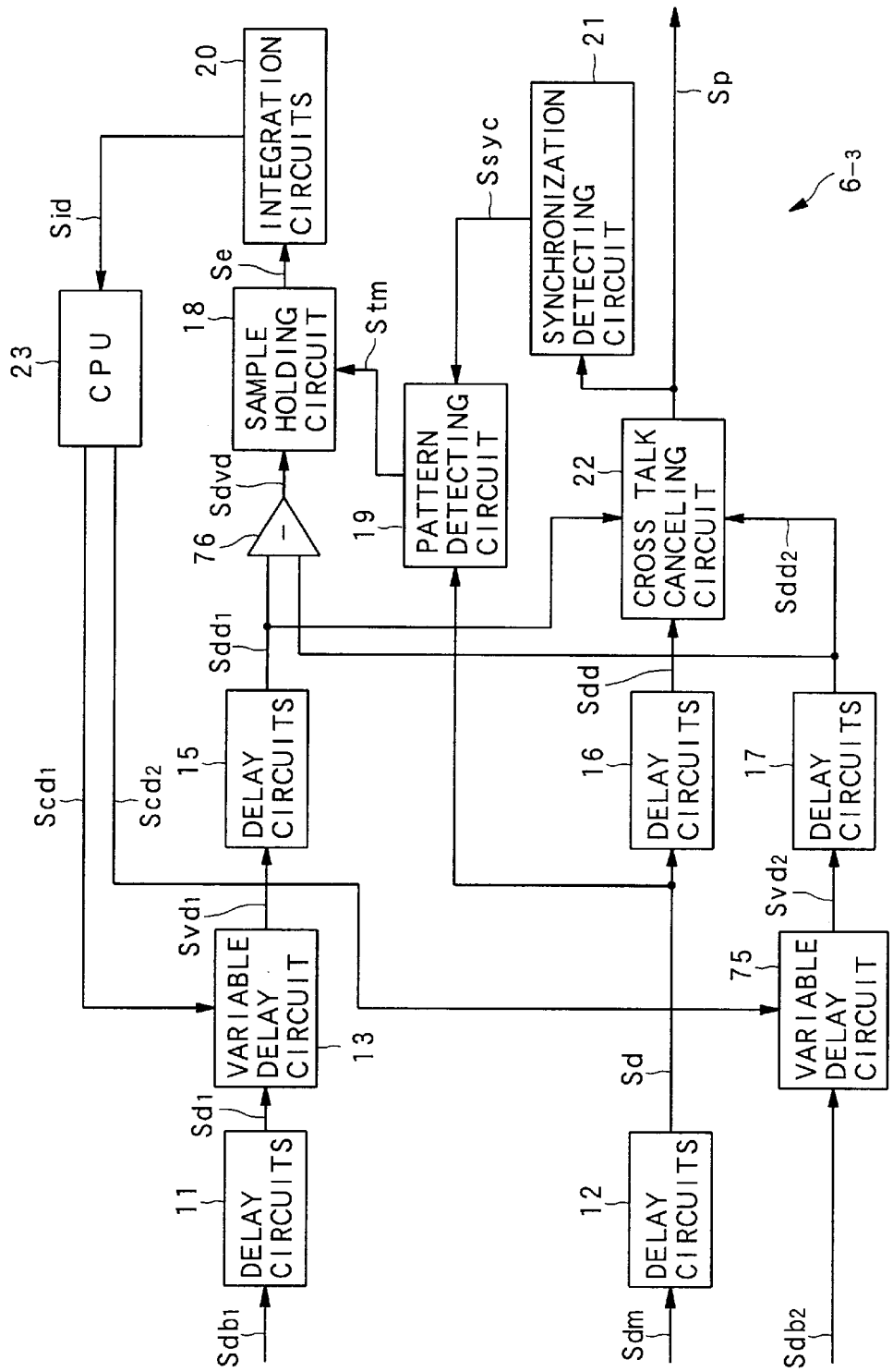
FIG. 12 is a block diagram for illustrating a schematic structure of a signal processing unit according to the third modified embodiment of the present invention.

Further, as shown in FIG. 12, namely, a block diagram for illustrating a schematic structure of a signal processing unit $6_{-3}$ according to the third modified embodiment obtained by combining the first modified embodiment and the second modified embodiment, a signal to be sampled and held in the sample holding circuit 18 is generated by using both of the digital detected signals Sdb1 and Sdb2 according to the present embodiment as well as the variable delay circuit 75 according to the first modified embodiment is capable of being used in place of the variable delay circuit 14 according to the embodiment.

In this case, as shown in FIG. 12, as well as the second modified embodiment, in addition to a structure of the signal processing circuit 6, the subtracter 76 is structured such that the subtraction signal Sdvd for illustrating a subtracting result in this subtracter 76 is sampled and held in the sample holding circuit 18 on the basis of the zero class signal Stm.

Figure 13:
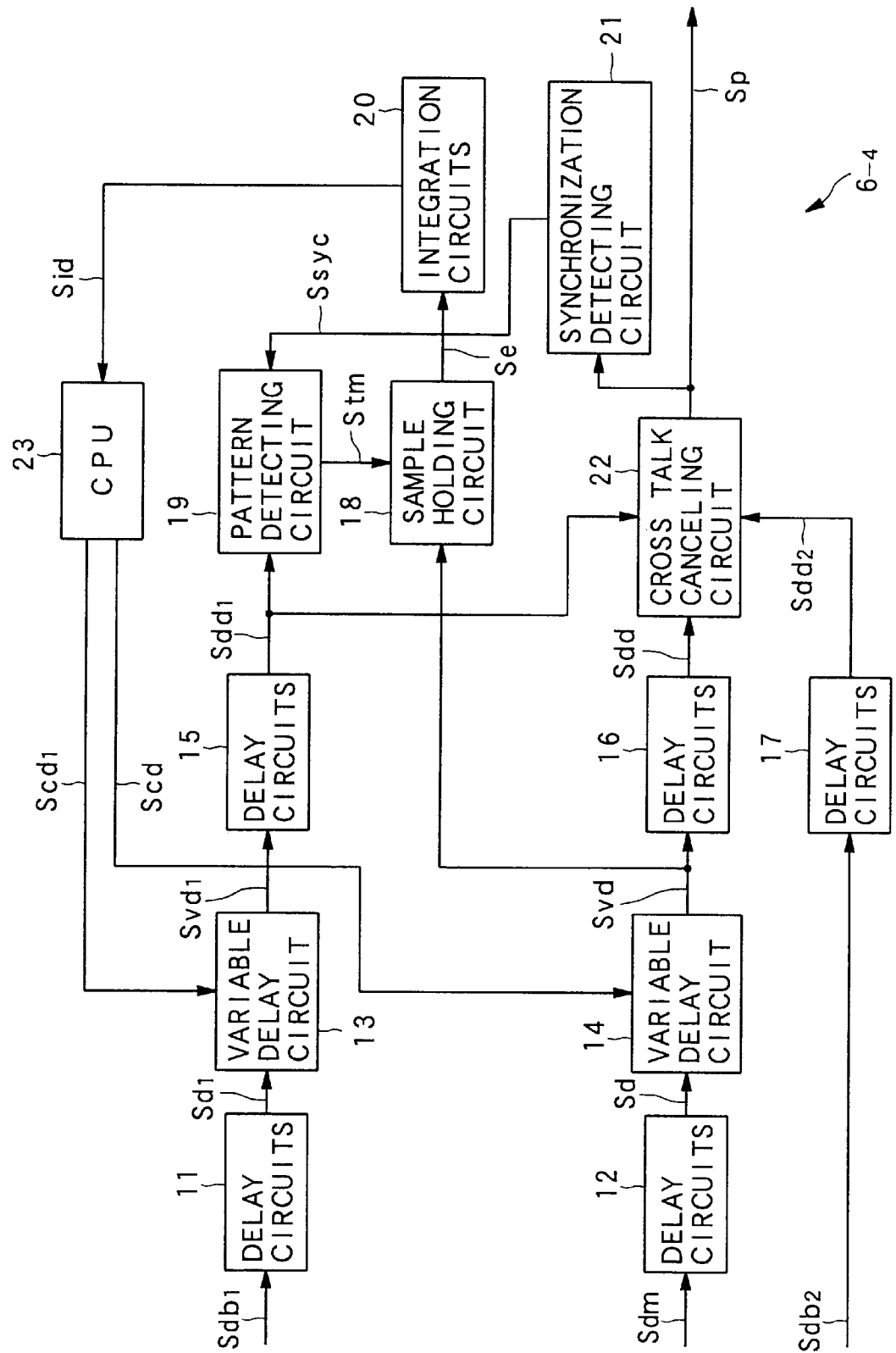
FIG. 13 is a block diagram for illustrating a schematic structure of a signal processing unit according to the fourth modified embodiment of the present invention.

In the next place, as the forth modified embodiment, as shown in FIG. 13, namely, a block diagram for illustrating a schematic structure of a signal processing unit $6_{-4}$ according to the forth modified embodiment, the zero cross waveform in the digital detected signal Sdm is not compared with the waveform of the digital detected signal Sdb1 at the present zero cross timing according to the embodiment, but the signal processing unit may be structured such that the zero cross waveform of the digital detected signal Sdb1 is compared with the waveform of the digital detected signal Sdm at the present zero cross timing to generate the foregoing hold signal Se and output it to the integration circuit 20.

In this case, as shown in FIG. 13, at first, a zero cross timing of a re-delay detected signal Sdd1 is detected on the basis of the re-delay detected signal Sdd1, the adjustment detected signal Svd is sampled and held at the present zero cross timing by receiving the zero cross signal Stm and this result is output to the integration circuit 20 as a hold signal Se.

In this case, it is also possible to obtain the same effect as that of the signal processing unit 6 according to the embodiment.

Figure 14:
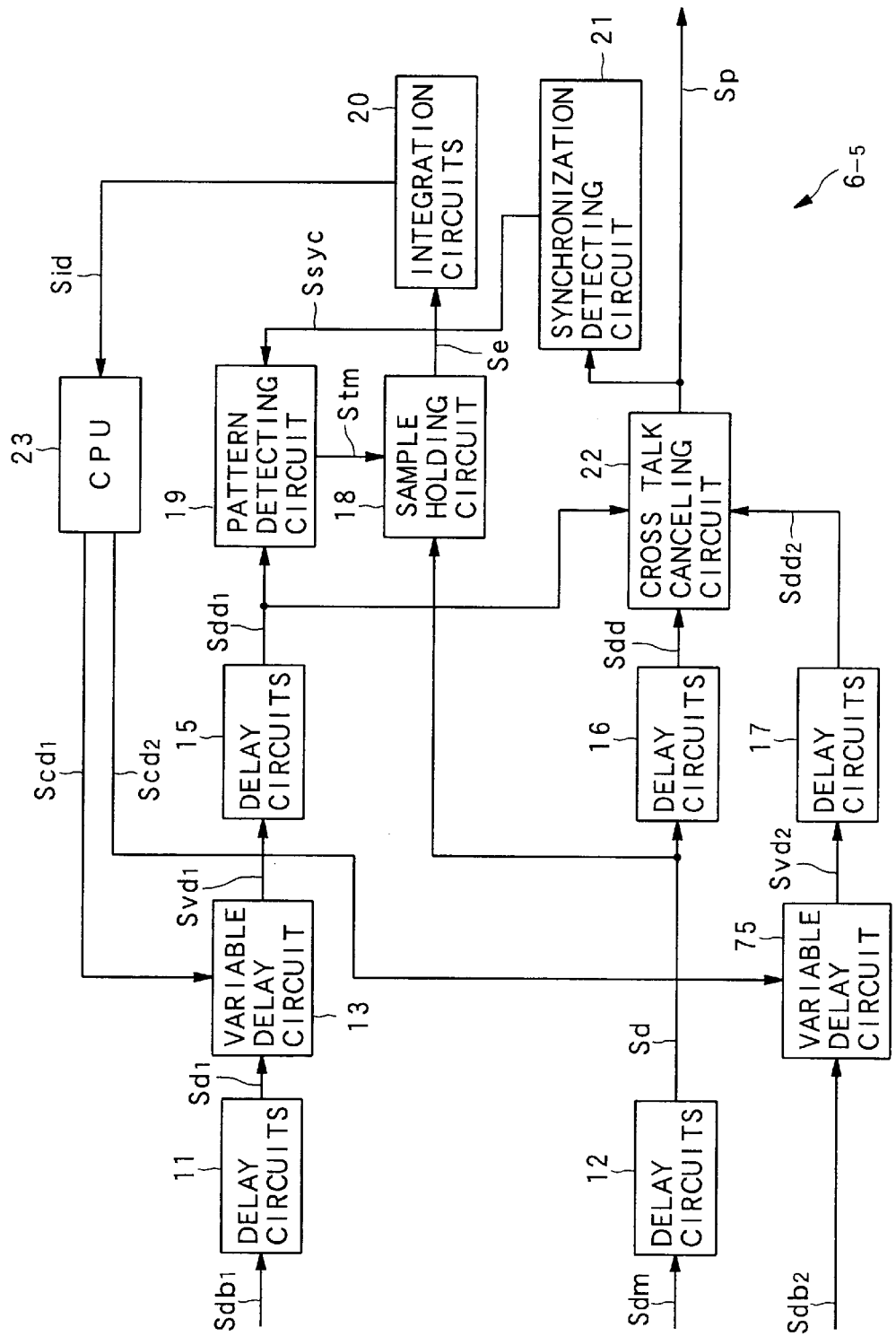
FIG. 14 is a block diagram for illustrating a schematic structure of a signal processing unit according to the fifth modified embodiment of the present invention.

In the next place, as the fifth modified embodiment obtained by combining the first modified embodiment and the fourth modified embodiment, as shown in FIG. 14, namely, a block diagram for illustrating a schematic structure of a signal processing unit $6_{-5}$ according to the fifth modified embodiment, in place of the variable delay circuit 14 according to the signal processing unit $6_{-4}$ of the fourth embodiment, it is possible to use a variable delay circuit 75 (having the same structured as that of the foregoing variable delay circuit 14) for delaying the digital detected signal Sdb2 with the delay amount being variable on the basis of a control signal Scd2 from the CPU 23.

In this case, with respect to the delay amount of the variable delay circuits 13 and 75, as well as the first modified embodiment, the delay amount in the variable delay circuit 75 is controlled so as to a relation such that the present delay amount is $-\Delta d$ when the delay amount in the variable delay circuit 13 is defined as $\Delta d$ is maintained.

Figure 15:
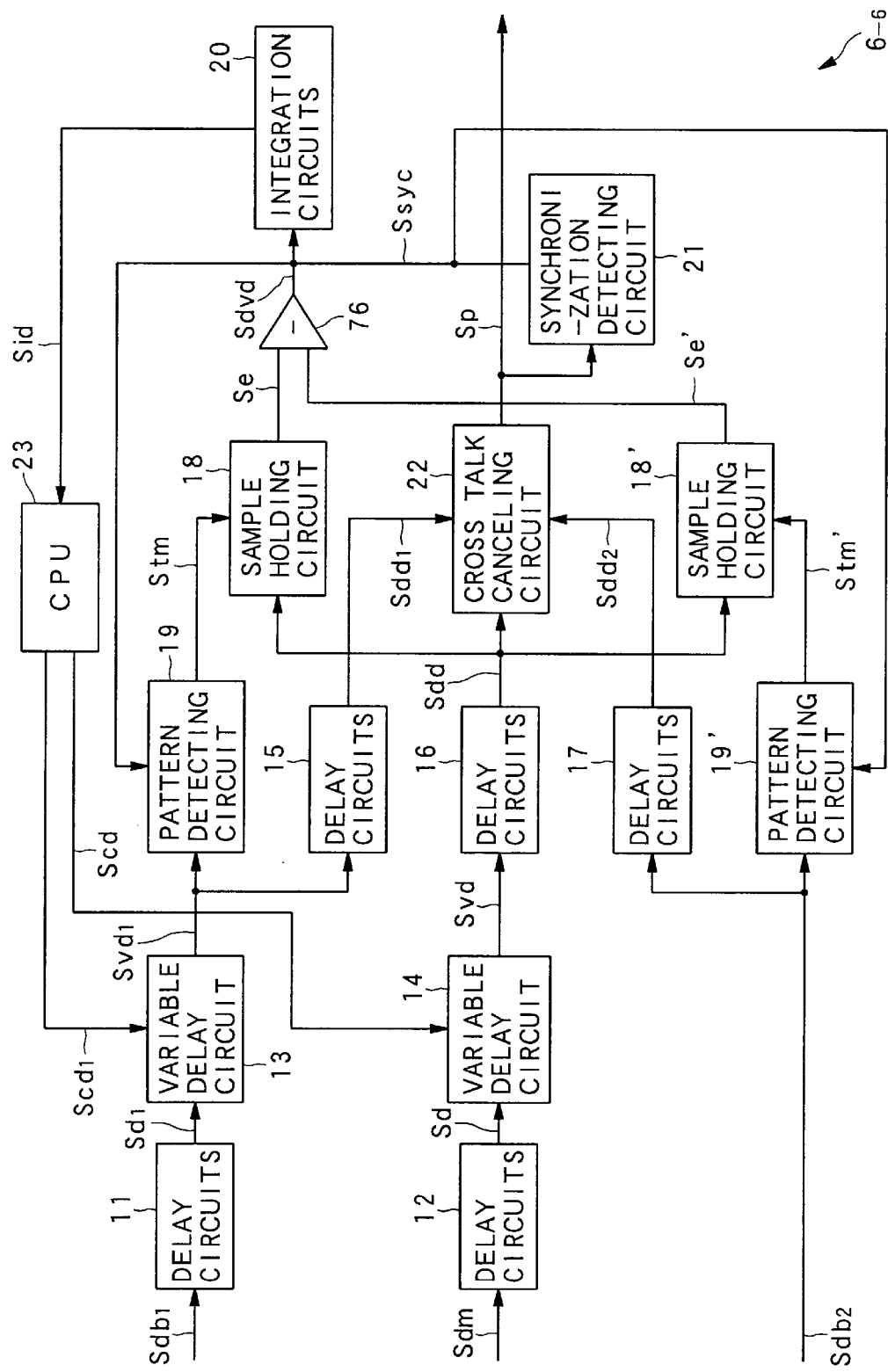
FIG. 15 is a block diagram for illustrating a schematic structure of a signal processing unit according to the sixth modified embodiment of the present invention.

Further, as the six modified embodiment, as shown in FIG. 15, namely, a block diagram for illustrating a schematic structure of a signal processing unit $6_{-6}$ according to the six modified embodiment, the signal processing unit may be structured such that the zero cross waveform of the digital detected signal Sdb2 is compared with the waveform of the digital detected signal Sdm at the present zero cross timing to separately generate the hold signal Se' and generate the foregoing error signal Sid by the integration circuit 20 by using this hold signal Se' and the hold signal Se.

In this case, as shown in FIG. 15, at first, the adjusted detected signal Svd1 from the variable delay circuit 13 is output to the delay circuit 15 and the pattern detecting circuit 19 to detect the zero cross timing in the present adjusted detected signal Svd1 by this pattern detecting circuit 19, samples and holds the re-delay detected signal Sdd at this zero cross timing and output this holding result as the hold signal Se to one input terminal of the newly added subtracter 76 as well as the third modified embodiment.

On the other hand, the digital detected circuit Sdb2 is output to the delay circuit 17 and a newly added pattern detecting circuit 19' (having the same structure of the pattern detecting circuit 19). Then, the zero cross timing in the present digital detected signal Sdb2 is detected by this pattern detecting circuit 19, the re-delay detected signal Sdd is sampled and held in a sample holding circuit 18' at this zero cross timing and this holding result is output to other input terminal of the subtracter 76 as a hold signal Se'.

After that, as the third modified embodiment, the subtraction signal Sdvd for illustrating a subtracting result in the present subtracter 76 is output to the integration circuit 20 in place of the hold signal Se according to the embodiment. Then, by the same processing as the embodiment, the error signal Sid is generated.

According to this signal processing circuit $6_{-6}$ according to the six modified embodiment, the error of the delay amount is more accurately calculated.

Figure 16:
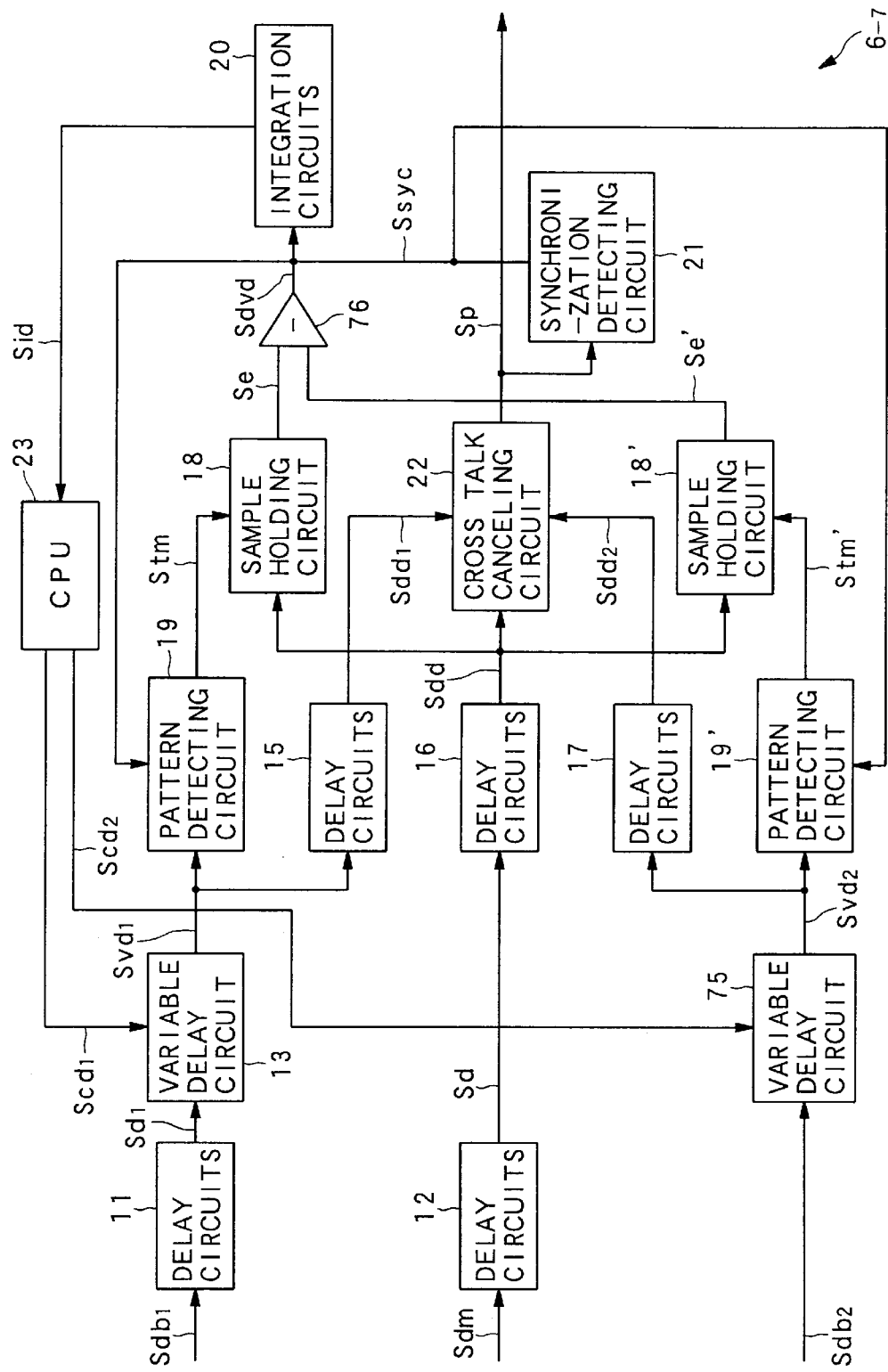
FIG. 16 is a block diagram for illustrating a schematic structure of a signal processing unit according to the seventh modified embodiment of the present invention.

At the end, as the seventh modified embodiment obtained by combining the first modified embodiment and the sixth modified embodiment, as shown in FIG. 16, namely, a block diagram for illustrating a schematic structure of a signal processing unit $6_{-7}$ according to the seventh modified embodiment, in place of the variable delay circuit 14 according to the signal processing unit $6_{-6}$ of the sixth embodiment, it is possible to use a variable delay circuit 75 (having the same structured as that of the foregoing variable delay circuit 14) for delaying the digital detected signal Sdb2 with the delay amount being variable on the basis of a control signal Scd2 from the CPU 23.

In this case, with respect to the delay amount of the variable delay circuits 13 and 75, as well as the first modified embodiment, the delay amount in the variable delay circuit 75 is controlled so as to a relation such that the present delay amount is −Δd when the delay amount in the variable delay circuit 13 is defined as Δd is maintained.

Figure 17:
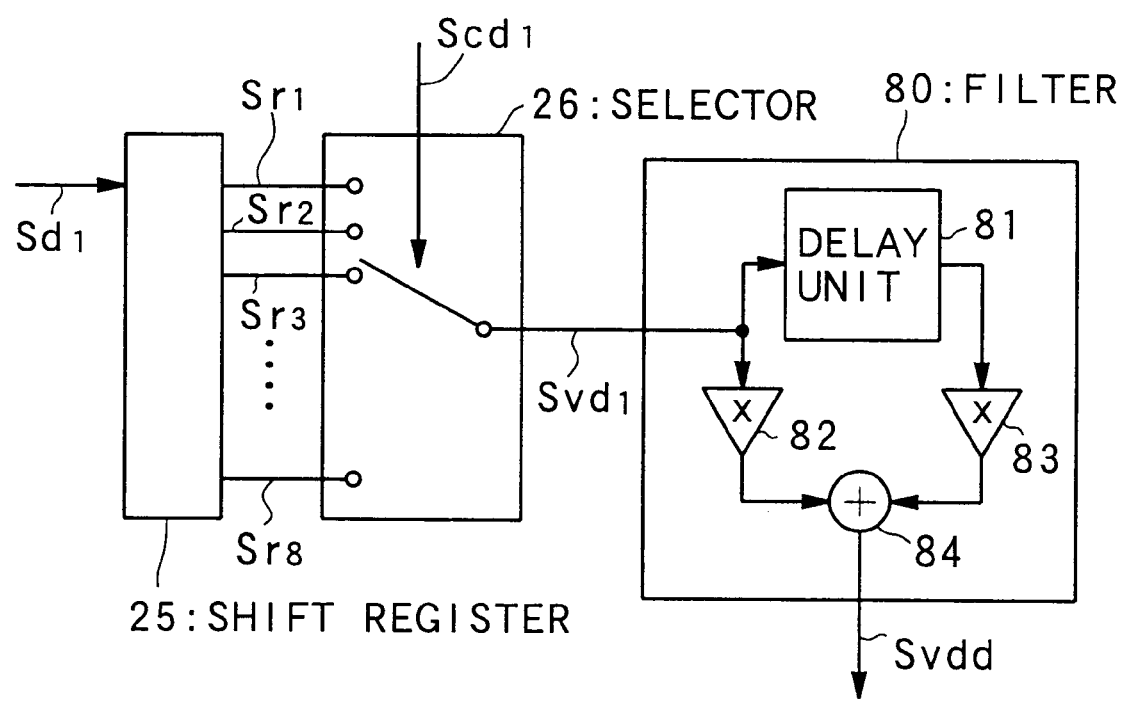
FIG. 17 is a block diagram for illustrating a schematic structure of a variable delay circuit according to the modified embodiment of the present invention.

Further, as a modified embodiment according to the detailed structure of the variable delay circuits 13 and 14 or 75, in addition to a structure of the foregoing variable delay circuits 13 and 14 or 75 shown in FIG. 5, as shown in FIG. 17, a filter 80 as a FIR filter may be added.

In this case, a filter 80 according to the modified embodiment is comprised of: a delay unit 81 for further delaying the adjusted detected signal Svd1 by one reference clock; a multiplier 82 for multiplying adjusted detected signal Svd1 by a predetermined coefficient k; a multiplier 83 for multiplying the output signal of the delay unit 81 by other predetermined coefficient k'; and an adder 84 for adding the output signals of respective multipliers and outputting this result to the delay circuit 15 as an adjustment detecting signal Svdd. In this time, a sum of the coefficient k and the coefficient k' is always maintained as "1".

The variable delay circuits 13 or 14 according to the embodiment can adjust the delay amount only by one reference clock unit. However, according to the structure of this modified embodiment, it is possible to adjust the delay amount with an accuracy less than one reference clock unit in response to a value of the foregoing coefficient k (or a coefficient k').

Figure 18:
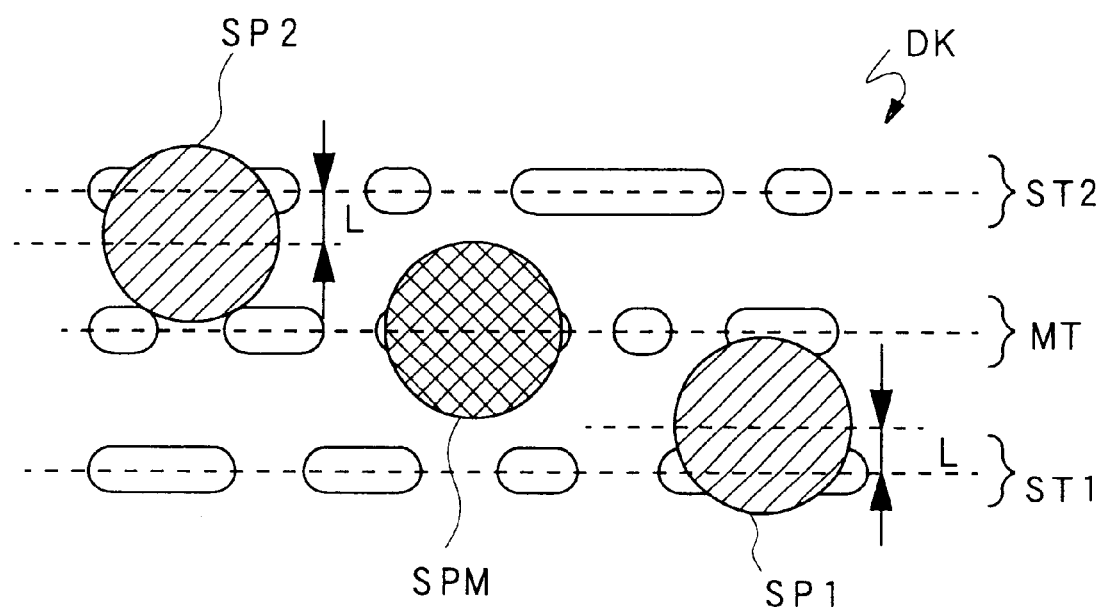
FIG. 18 is a diagram for illustrating the modified embodiment of the information reproducing apparatus.

Further, as a modified embodiment according to entirety of the information playing apparatus S shown in FIG. 2, as shown in FIG. 18, the diffraction angle of the diffraction grating 2 may be adjusted so that the optical spots SP1 and SP2 corresponding to the sub beams S1 and S2 are formed near the main truck MT with being separated by a distance L shown in FIG. 18

In this case, as the optical spots SP1 and SP2 move forward to the main truck MT, respectively, a level of a cross talk component in association with the pits P on the main truck MT is heighten. Accordingly, a ratio between a signal and a noise in the error Δd of the delay amount included in the error signal Sid is heighten (namely, even when the same delay errors are generated, the error Δd for illustrating this delay becomes larger). As a result, it is possible to obtain a delay amount accurately by controlling the present delay error with a high degree of accuracy.

Alternatively, the above described embodiment and respective modified embodiments were explained in the case that the present invention is applied to an information playing apparatus S for playing the information recorded in the optical disk DK. However, other than this, the present invention may be applied to a case of detecting the recording control information by an information recording apparatus for detecting the recording control information recorded in a recordable optical disk in advance (for example, the address information or the like for illustrating a recording position of the information to be recorded) and recording the necessary information in the present optical disk on the basis of the detected recording control information.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-284219 filed on Sep. 19, 2000 including the specification, claims, drawings and summary is incorporated herein by reference in its entirety.

What is claimed is:

1. A signal delay apparatus for delaying any one of detected signals, which are optically obtained from a plurality of adjoining trucks, comprising:

an extracting device for extracting a specific main detected signal having a predetermined specific waveform from a main detected signal which is obtained from a main truck among said trucks;

a holding device for holding a sub detected signal which is obtained from a sub truck when said specific main detected signal is extracted;

an averaging device for averaging a plurality of said sub detected signals, which are held by said holding device during a predetermined time frame, and generating an averaged detected signal;

a calculating device for comparing a waveform of said generated averaged detected signal with said specific waveform and calculating the delay amount for any one of said detected signals; and a delay device for delaying at least any one of said detected signals by said calculated delay amount.

2. The signal delay apparatus according to claim 1, wherein said specific waveform comprises a zero cross waveform.

3. The signal delay apparatus according to claim 1, wherein said specific wave form comprises a waveform of said main detected signal, which is obtained from any one of a pit formed on said main truck in association with said information and a gap between pits, having a length which is longer than the length obtained by multiplying a unit length of at least any one of said pit and gap by a predetermined number.

4. The signal delay apparatus according to claim 1, wherein said specific waveform during a predetermined time from said detected signal is started to be obtained comprises a waveform of said main detected signal, which is obtained from any one of a pit formed on said main truck in association with said information and a gap between pits, having a length which is longer than the length obtained by multiplying a unit length of at least any one of said pit and gap by a predetermined number, and said specific waveform after said time passed over comprises a waveform of said main detected signal, which is obtained from any one of said pit and gap having all lengths.

5. The signal delay apparatus according to claim 3, wherein said predetermined number comprises a number corresponding to a length, which is longer than the shortest length of any one of said pit and gap, from which said main detected signal is obtained.

6. The signal delay apparatus according to claim 1, wherein said delay device comprises a shift register.

7. The signal delay apparatus according to claim 1, wherein said delay device comprises a shift register and a FIR (Finite Impulse Response) filter.

8. The signal delay apparatus according to claim 7, wherein said FIR filter comprises two taps and a sum of respective tap coefficients in association with said respective taps is 1.

9. The signal delay apparatus according to claim 1, wherein said sub truck comprises said two trucks, which are adjacently formed on the opposite sides of said main truck and an irradiation position of respective optical beams, which are irradiated to said sub truck, moves to said main truck side rather than said respective sub trucks, so that said respective optical beams are irradiated.

10. The signal delay apparatus according to claim 1, wherein said main truck comprises said truck, in which said information to be read is recorded.

11. The signal delay apparatus according to claim 1, wherein said main truck comprises said truck, which adjoins to said truck, in which said information to be read is recorded.

12. A leakage signal removing apparatus comprising:

(i) a signal delay apparatus for delaying any one of detected signals, which are optically obtained from a plurality of adjoining trucks, comprising:

an extracting device for extracting a specific main detected signal having a predetermined specific waveform from a main detected signal which is obtained from a main truck among said trucks;

a holding device for holding a sub detected signal which is obtained from a sub truck when said specific main detected signal is extracted;

an averaging device for averaging a plurality of said sub detected signals, which are held by said holding device during a predetermined time frame, and generating an averaged detected signal;

a calculating device for comparing a waveform of said generated averaged detected signal with said specific waveform and calculating the delay amount for any one of said detected signals; and a delay device for delaying at least any one of said detected signals by said calculated delay amount, (ii) a removing device for removing a leakage signal, which is mixed in said main detected signal, from said detected signal, which is obtained from said sub truck by using said detected signal, which is obtained from said sub truck and is delayed by said delay device.

13. A signal processing apparatus comprising:

(a) a leakage signal removing apparatus comprising: (i) a signal delay apparatus for delaying any one of detected signals, which are optically obtained from a plurality of adjoining trucks, comprising: an extracting device for extracting a specific main detected signal having a predetermined specific waveform from a main detected signal which is obtained from a main truck among said trucks; a holding device for holding a sub detected signal which is obtained from a sub truck when said specific main detected signal is extracted; an averaging device for averaging a plurality of said sub detected signals, which are held by said holding device during a predetermined time frame, and generating an averaged detected signal; a calculating device for comparing a waveform of said generated averaged detected signal with said specific waveform and calculating the delay amount for any one of said detected signals; and a delay device for delaying at least any one of said detected signals by said calculated delay amount, (ii) a removing device for removing a leakage signal, which is mixed in said main detected signal, from said detected signal, which is obtained from said sub truck by using said detected signal, which is obtained from said sub truck and is delayed by said delay device, (b) a processing device for effecting at least any one of recording of said information in said truck or playing of said information on the basis of said main detected signal, of which said leakage signal is removed.

* * * * *